(12) United States Patent
Sendai et al.

(10) Patent No.: US 10,303,435 B2
(45) Date of Patent: May 28, 2019

(54) HEAD-MOUNTED DISPLAY DEVICE, METHOD OF CONTROLLING HEAD-MOUNTED DISPLAY DEVICE, AND COMPUTER PROGRAM

(71) Applicant: SEIKO EPSON CORPORATION, Tokyo (JP)

(72) Inventors: Kaori Sendai, Okaya (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 151 days.

(21) Appl. No.: 14/982,441

(22) Filed: Dec. 29, 2015

(65) Prior Publication Data

US 2016/0209916 A1 Jul. 21, 2016

(30) Foreign Application Priority Data

Jan. 15, 2015 (JP) .................. 2015-005450
Nov. 17, 2015 (JP) .................. 2015-224556

(51) Int. Cl.
*G06F 3/16* (2006.01)
*G02B 27/01* (2006.01)
*G02B 27/00* (2006.01)
*G06F 3/01* (2006.01)

(52) U.S. Cl.
CPC ......... *G06F 3/167* (2013.01); *G02B 27/0093* (2013.01); *G02B 27/017* (2013.01); *G02B 27/0172* (2013.01); *G06F 3/012* (2013.01); *G06F 3/017* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC ......................... G02B 23/125; G02B 27/017
See application file for complete search history.

(56) References Cited

U.S. PATENT DOCUMENTS

2002/0089544 A1 7/2002 Jahn et al.
2008/0243385 A1* 10/2008 Yamamoto ........... G01C 21/005
 701/300
2013/0141576 A1* 6/2013 Lord ..................... G08G 1/04
 348/148

(Continued)

FOREIGN PATENT DOCUMENTS

JP 2002-159019 A 5/2002
JP 2006-155238 A 6/2006

(Continued)

*Primary Examiner* — Michael A Faragalla
*Assistant Examiner* — Chayce R Bibbee
(74) *Attorney, Agent, or Firm* — Oliff PLC

(57) ABSTRACT

A head-mounted display device with which a user can visually recognize a virtual image includes an image display section configured to cause the user to visually recognize the virtual image, an image acquiring section configured to acquire an outside scene image in a visual field direction of the user in a state in which the head-mounted display device is mounted, and a guiding section configured to guide, with sound, the user to an object of attention, which is at least one real object present in the real world and included in the acquired outside scene image and is a real object to which the user is urged to pay attention.

13 Claims, 18 Drawing Sheets

(56) References Cited

U.S. PATENT DOCUMENTS

2013/0194164 A1* 8/2013 Sugden ............... G02B 27/017
                                                    345/8
2013/0328928 A1* 12/2013 Yamagishi ........... G02B 27/017
                                                    345/633
2014/0300636 A1   10/2014 Miyazaya et al.

FOREIGN PATENT DOCUMENTS

| JP | 2013-162285 A | 8/2013 |
| JP | 2014-071756 A | 4/2014 |
| JP | 2014-146871 A | 8/2014 |

* cited by examiner

FIG.5

| | OBJECT 1 | OBJECT 2 | GUIDANCE CONTENT |
|---|---|---|---|
| E1 | BOTTLE | GLASS | • GUIDE MOUTH OF BOTTLE TO CENTER OF GLASS<br>• GUIDE ABOUT AMOUNT OF LIQUID IN GLASS ( * ) |
| E2 | FAUCET | MEASURING CUP | • GUIDE FAUCET TO CENTER OF MEASURING CUP<br>• GUIDE ABOUT AMOUNT OF LIQUID IN MEASURING CUP ( * ) |
| E3 | SEAL | SEALING SPACE | • GUIDE IMPRINT SURFACE OF SEAL TO CENTER OF SEALING SPACE<br>• GUIDE ABOUT WHETHER SEAL IS CLEARLY PRINTED ( * ) |
| E4 | JAR | DESK | • GUIDE JAR TO CENTER OF DESK |
| E5 | CAR | – | • GUIDE CALL FOR ATTENTION TO CAR<br>• GUIDE ABOUT DISTANCE TO CAR ( * ) |
| E6 | PERSON | – | • GUIDE CALL FOR ATTENTION TO PERSON<br>• GUIDE ABOUT DISTANCE TO PERSON ( * ) |
| E7 | WALL | – | • GUIDE CALL FOR ATTENTION TO WALL<br>• GUIDE ABOUT DISTANCE TO WALL ( * ) |
| E8 | SIGNBOARD | – | • GUIDE CALL FOR ATTENTION TO SIGNBOARD<br>• GUIDE ABOUT CONTENT OF SIGNBOARD |
| | ⋮ | ⋮ | ⋮ |

*FIG.15*

| | OBJECT 1 | OBJECT 2 | GUIDANCE CONTENT | TYPE |
|---|---|---|---|---|
| E1 | BOTTLE | GLASS | • GUIDE MOUTH OF BOTTLE TO CENTER OF GLASS | POSITION |
| | | | • GUIDE ABOUT AMOUNT OF LIQUID IN GLASS (*) | INFORMATION |
| E2 | FAUCET | MEASURING CUP | • GUIDE FAUCET TO CENTER OF MEASURING CUP | POSITION |
| | | | • GUIDE ABOUT AMOUNT OF LIQUID IN MEASURING CUP (*) | INFORMATION |
| E3 | SEAL | SEALING SPACE | • GUIDE IMPRINT SURFACE OF SEAL TO CENTER OF SEALING SPACE | POSITION |
| | | | • GUIDE ABOUT WHETHER SEAL IS CLEARLY PRINTED (*) | INFORMATION |
| E4 | JAR | DESK | • GUIDE JAR TO CENTER OF DESK | POSITION |
| E5 | CAR | – | • GUIDE CALL FOR ATTENTION TO CAR | CALL FOR ATTENTION |
| | | | • GUIDE ABOUT DISTANCE TO CAR (*) | INFORMATION |
| E6 | PERSON | – | • GUIDE CALL FOR ATTENTION TO PERSON | CALL FOR ATTENTION |
| | | | • GUIDE ABOUT DISTANCE TO PERSON (*) | INFORMATION |
| E7 | WALL | – | • GUIDE CALL FOR ATTENTION TO WALL | CALL FOR ATTENTION |
| | | | • GUIDE ABOUT DISTANCE TO WALL (*) | INFORMATION |
| E8 | SIGNBOARD | – | • GUIDE CALL FOR ATTENTION TO SIGNBOARD | CALL FOR ATTENTION |
| | | | • GUIDE ABOUT CONTENT OF SIGNBOARD | INFORMATION |
| | ⋮ | ⋮ | ⋮ | ⋮ |

122a

HEAD-MOUNTED DISPLAY DEVICE, METHOD OF CONTROLLING HEAD-MOUNTED DISPLAY DEVICE, AND COMPUTER PROGRAM

BACKGROUND

1. Technical Field

The present invention relates to a head-mounted display device.

2. Related Art

There is known a head-mounted display device mounted on the head of a user and used to form a virtual image in a visual field area of the user. The head-mounted display device is also called head mounted display (HMD). In recent years, in such an HMD, in order to urge the user to pay attention to a real object present in the real world, a technique of an augmented reality (AR) is used.

In order to realize the AR in the HMD, the HMD picks up an image of an outside scene with, for example, a camera, recognizes the image obtained by the image pickup, and generates or acquires a virtual object. An HMD of a transmission type, which does not block a visual field of the user in a worn state of the HMD, causes the user to visually recognize only a virtual image including the virtual object. The user can experience the AR by viewing both of the real object in the real world and the virtual object represented by the virtual image. JP-A-2014-71756 (Patent Literature 1) describes a technique for displaying, in an HMD, according to the position of a work target object, which is a real object present in the real world, and the present position of a user, an image of an arrow representing a direction in which the user should move next.

The virtual image of the HMD is formed in the visual field area of the user. Therefore, in the technique described in Patent Literature 1, the visual field of the user is further narrowed, in other words, the visibility of the real world is further deteriorated as an amount of information displayed as a virtual image (an image) increases more. In this way, in the technique for using the AR to urge the user to pay attention to the real object present in the real world, there is room of improvement for securing the visibility of the real world. A technique described in JP-A-2002-159019 (Patent Literature 2) does not take into account the urging the user to pay attention to the real object present in the real world.

Therefore, there has been a demand for a head-mounted display device capable of, while securing the visibility of the real world, urging a user to pay attention to a real object present in the real world.

SUMMARY

An advantage of some aspects of the invention is to solve at least a part of the problems described above and the invention can be implemented as the following forms.

(1) An aspect of the invention provides a head-mounted display device with which a user can visually recognize a virtual image. The head-mounted display device includes: an image display section configured to cause the user to visually recognize the virtual image; an image acquiring section configured to acquire an outside scene image in a visual field direction of the user in a state in which the head-mounted display device is mounted; and a guiding section configured to guide, with sound, the user to an object of attention, which is at least one real object present in the real world and included in the acquired outside scene image and is a real object to which the user is urged to pay attention.

With the head-mounted display device according to this aspect, the guiding section can guide, with sound, the user to the object of attention, which is at least one real object present in the real world and included in the acquired outside scene image and is the real object to which the user is urged to pay attention. Compared with guidance performed using a virtual image formed in a visual field area of the user, the guidance performed using the sound can reduce the likelihood that a visual field of the user is narrowed, in other words, the likelihood that the visibility of the real world is deteriorated. As a result, it is possible to provide the head-mounted display device capable of urging the user to pay attention to the real object present in the real world while securing the visibility of the real world.

(2) In the head-mounted display device according to the aspect, the head-mounted display device may further include a visual-line detecting section configured to detect the direction of a visual line of the user in the state in which the head-mounted display device is mounted, and the guiding section may perform the guidance with the sound when it is estimated that the object of attention is absent in the detected direction of the visual line and, when it is estimated that the object of attention is present in the detected direction of the visual line, perform the guidance by, in addition to the sound, causing the image display section to form the virtual image including a virtual object to be additionally displayed on the object of attention.

With the head-mounted display device according to this aspect, the guiding section performs the guidance with the sound when it is estimated that the object of attention is absent in the direction of the visual line of the user. Therefore, the guiding section can suppress the virtual image from being formed in the visual field area of the user to guide the user to the object of attention absent in the direction of the visual field and can secure the visibility of the real world. On the other hand, when it is estimated that the object of attention is present in the direction of the visual line of the user, the guiding section performs the guidance by, in addition to the sound, causing the image display section to form the virtual image including the virtual object to be additionally displayed on the object of attention. Therefore, the guiding section can elaborately perform, using both of the sound and the virtual image, the guidance to the object of attention present in the direction of the visual field. That is, concerning the object of attention present in the direction of the visual line of the user, the user can enjoy the guidance via the visual sense and the auditory sense. As a result, in the head-mounted display device capable of, while securing the visibility of the real world, urging the user to pay attention to the real object present in the real world, it is possible to further improve user convenience.

(3) In the head-mounted display device according to the aspect, the guidance may include at least any one of guidance for a call for attention of the user to the object of attention, guidance of information concerning the object of attention, guidance concerning the position of the object of attention, and guidance of work content of the user to the object of attention based on procedure information prepared in advance.

With the head-mounted display device according to this aspect, the guidance by the guiding section can be realized in various forms. For example, when performing the guidance for a call for attention of the user to the object of attention, the guiding section can perform guidance for danger avoidance for the user. When performing the guidance of the information concerning the object of attention, the guiding section can perform guidance for information provision to the user. When performing the guidance concerning the position of the object of attention, the guiding section can perform guidance for motion assistance for the user. When performing the guidance of the work content of the user to the object of attention, the guiding section can perform guidance for work support for the user.

(4) In the head-mounted display device according to the aspect, the guiding section may determine, according to an operation input from the user, which of the call for attention, the information, the position, and the work content is included as the guidance.

With the head-mounted display device according to this aspect, the guiding section determines a type of the guidance (the call for attention, the information, the position, and the work content) according to the operation input from the user. Therefore, it is possible to improve user convenience.

(5) In the head-mounted display device according to the aspect, the image acquiring section may repeatedly acquire the outside scene image, and the guiding section may further respectively recognize an acquired plurality of outside scene images, and specify, as the object of attention, a real object included in the plurality of outside scene images and having a large change with time.

With the head-mounted display device according to this aspect, the guiding section can automatically specify the object of attention from the acquired outside scene image. The guiding section specifies, as the object of attention, the real object having the large change with time in the repeatedly-acquired plurality of outside scene images. Therefore, the guiding section can specify, as the object of attention, a real object having, for example, a large movement amount or high moving speed. The object of attention specified in this way is particularly suitable for the guidance for the danger avoidance.

(6) In the head-mounted display device according to the aspect, the guiding section may further recognize the acquired outside scene image and specify, as the object of attention, a real object included in the outside scene image and having a predetermined characteristic.

With the head-mounted display device according to this aspect, the guiding section can automatically specify the object of attention from the acquired outside scene image. The guiding section specifies, as the object of attention, the real object having the predetermined characteristic in the outside scene image. Therefore, for example, it is possible to specify various real objects as the object of attention by preparing the "predetermined characteristic" in advance. The objection of attention specified in this way is suitable for the guidance for all types such as the danger avoidance, the information provision, the motion assistance, and the work support.

(7) In the head-mounted display device according to the aspect, the head-mounted display device may further include a visual-line detecting section configured to detect the direction of a visual line of the user in the state in which the head-mounted display device is mounted, the image acquiring section may repeatedly acquire the outside scene image, the visual-line detecting section may repeatedly detect the direction of the visual line, and the guiding section may further collate an acquired plurality of the outside scene images and the directions of the visual line detected a plurality of times and specify, as the object of attention, a real object included in the plurality of outside scene images and estimated to be present ahead of the visual line at a high percentage.

With the head-mounted display device according to this aspect, the guiding section can automatically specify the object of attention from the acquired outside scene image and the detected direction of the visual line. The guiding section collates the repeatedly-acquired plurality of outside scene images and the directions of the visual line and specifies, as the object of attention, the real object estimated to be present ahead of the visual line at a high percentage. Therefore, the guiding section can specify, as the object of attention, for example, a real object often viewed by the user. The object of attention specified in this way is particularly suitable for the guidance for the types such as the information provision, the motion assistance, and the work support.

(8) In the head-mounted display device according to the aspect, the head-mounted display device may further include an input-information acquiring section configured to acquire an operation input from the user, and the guiding section may further collate the acquired outside scene image and the acquired operation input and specify, as the object of attention, a real object included in the outside scene image and designated by the user.

With the head-mounted display device according to this aspect, the guiding section can automatically specify the object of attention from the acquired outside scene image and the acquired operation input. The guiding section specifies, as the object of attention, the real object designated by the user. Therefore, the guiding section can specify the object of attention reflecting the intention of the user. The objection of attention specified in this way is suitable for the guidance for all types such as the danger avoidance, the information provision, the motion assistance, and the work support.

(9) In the head-mounted display apparatus according to the aspect, the image acquiring section may repeatedly acquire the outside scene image, the input-information acquiring section may acquire a motion of a part of the body of the user by recognizing the repeatedly-acquired outside scene image, and the guiding section may collate the acquired outside scene image and the motion of the part of the body acquired as the operation input and specify, as the object of attention, a real object included in the outside scene image and intended by the user on the basis of the motion of the part of the body.

With the head-mounted display device according to this aspect, the guiding section can automatically specify the object of attention from the acquired outside scene image and the motion of the part or the like of the body of the user. Therefore, the user can intuitively designate the object of attention by performing an action of, for example, holding or pointing an intended real object. As a result, it is possible to specify the object of attention reflecting the intention of the user and improve user convenience.

(10) In the head-mounted display device according to the aspect, the guiding section may further cause the image display section to form the virtual image including a virtual object serving as a mark used by the user to designate the object of attention, at least one of the position, the size, and the shape of the virtual object being changed with time to follow the motion of the part of the body of the user.

With the head-mounted display device according to this aspect, the guiding section causes the image display section to form the virtual image including the virtual object serving as the mark used by the user to designate the object of attention. Therefore, the user can designate the object of attention while checking, out of a plurality of real objects present within the visual field of the user, a real object that the user intends to designate as the object of attention. As a result, it is possible to realize further improvement of user convenience.

(11) In the head-mounted display device according to the aspect, the input-information acquiring section may acquire the operation input from another device connected to the head-mounted display device.

With the head-mounted display device according to this aspect, the guiding section can acquire the operation input from another device connected to the head-mounted display device. Therefore, it is possible to improve user convenience.

(12) The head-mounted display device according to the aspect, the image display section may form the virtual image representing a virtual operation section for operating the head-mounted display device, the image acquiring section may repeatedly acquire the outside scene image, and the input-information acquiring section may acquire the operation input by collating a motion of a part of the body of the user acquired by recognizing the repeatedly-acquired outside scene image and the positions of sections in the virtual operation section.

With the head-mounted display device according to this aspect, the guiding section can acquire an operation input performed using the virtual operation section for operating the head-mounted display device. Therefore, it is possible to improve user convenience.

(13) In the head-mounted display device according to the aspect, the image acquiring section may repeatedly acquire the outside scene image, and the guiding section may repeatedly perform the guidance according to a change with time of the object of attention in an acquired plurality of the outside scene images.

With the head-mounted display device according to this aspect, the guiding section repeatedly performs the guidance according to the change with time of the object of attention in the repeatedly-acquired plurality of outside scene images. As a result, the guiding section can perform, at any time, guidance corresponding to the latest state of the object of attention. In other words, the guiding section can perform the guidance while tracking the object of attention.

(14) In the head-mounted display device according to the aspect, the guiding section may further acquire additional information used for the guidance.

With the head-mounted display device according to this aspect, the guiding section can acquire the additional information used for the guidance. Therefore, the guiding section can more accurately carry out the guidance taking into account the additional information.

Not all of a plurality of constituent elements of the aspect of the invention are essential. To solve a part or all of the problems or to attain apart or all of the effects described in this specification, concerning a part of the plurality of constituent elements, it is possible to appropriately perform a change, deletion, replacement with new constituent elements, and partial deletion of limited contents of the constituent elements. To solve a part or all of the problems or to attain a part or all of the effects described in this specification, it is also possible to combine a part or all of the technical features included in one aspect of the invention with apart or all of the technical features included in the other aspects of the invention to obtain an independent aspect of the invention.

For example, an aspect of the invention can be realized as a device including a part or all of the three elements, i.e., the image display section, the image acquiring section, and the guiding section. That is, the device may or may not include the image display section. The device may or may not include the image acquiring section. The device may or may not include the guiding section. Such a device can be realized as, for example, a head-mounted display device but can also be realized as devices other than the head-mounted display device. A part or all of the technical features of the aspect of the head-mounted display device explained above can be applied to the device. For example, a device according to an aspect of the invention has an object of, while securing the visibility of the real world, urging the user to pay attention to a real object present in the real world. However, besides, the device is desired to realize a reduction in the size of the device, improvement of convenience, a reduction in costs in manufacturing of the device, resource saving, facilitation of manufacturing, and the like.

Note that the invention can be realized in various forms. For example, the invention can be realized in forms such as a head-mounted display device, a control method for the head-mounted display device, a system including the head-mounted display device, a computer program for realizing functions of the method, the device, and the system, a server apparatus for distributing the computer program, and a storage medium having the computer program stored therein.

BRIEF DESCRIPTION OF THE DRAWINGS

The invention will be described with reference to the accompanying drawings, wherein like numbers reference like elements.

FIG. 5 is a diagram showing an example of information for guidance.

FIG. 15 is a diagram showing an example of information for guidance in a variation 3.

DESCRIPTION OF EXEMPLARY EMBODIMENTS

A. Embodiment

A. 1. Configuration of a Head-Mounted Display Device

Figure 1:
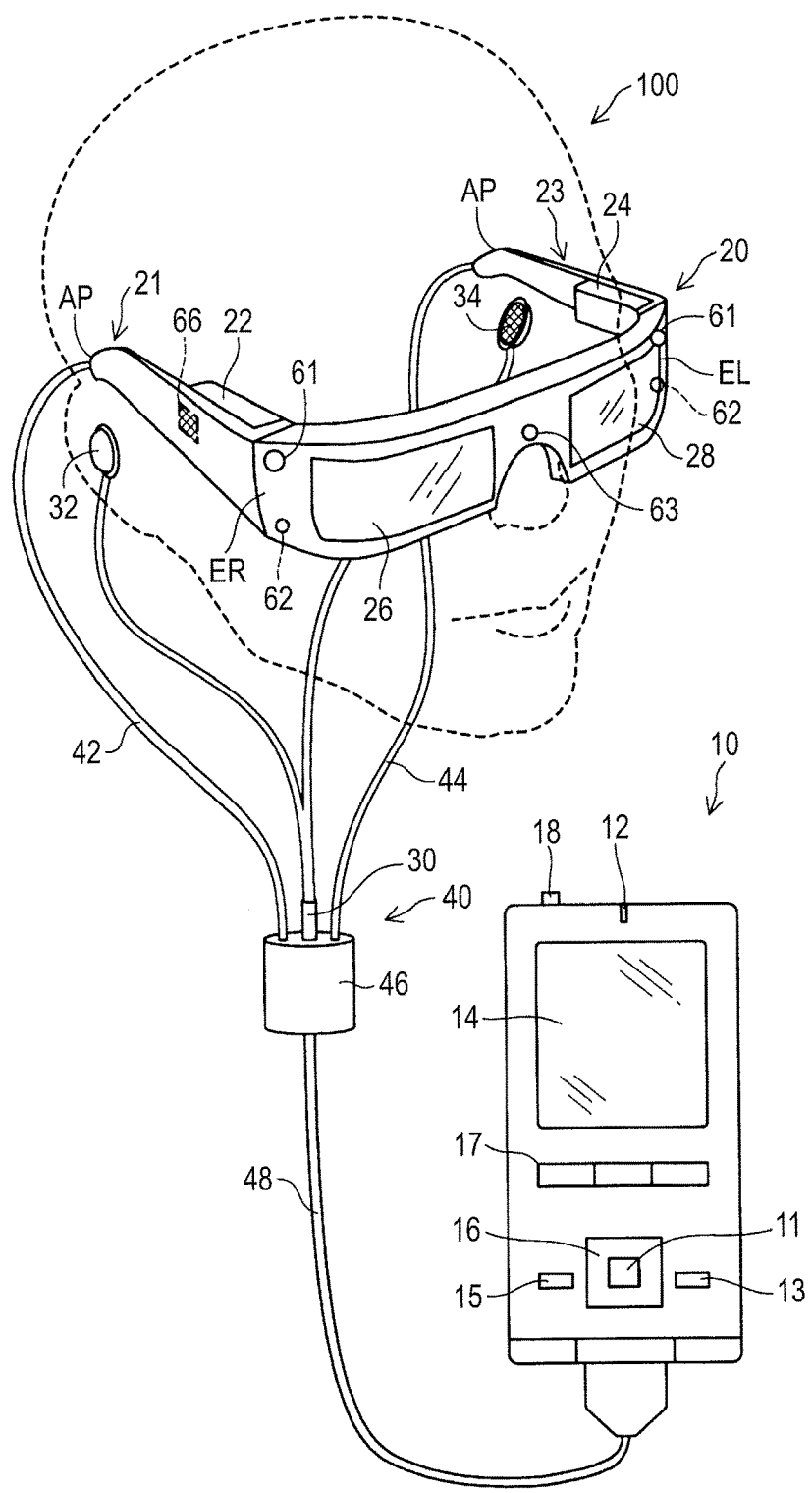
FIG. 1 is an explanatory diagram showing the schematic configuration of a head-mounted display device in an embodiment of the invention.

FIG. 1 is an explanatory diagram showing the schematic configuration of a head-mounted display device in an embodiment of the invention. A head-mounted display device 100 in this embodiment is a display device worn on a head and is called head mounted display (HMD) as well. The HMD 100 is a head mounted display of an optical transmission type with which a user is capable of visually recognizing a virtual image and, at the same time, directly visually recognizing an outside scene.

The HMD 100 in this embodiment performs guidance processing explained below to carry out guidance to an object of attention with "only voice" or "a combination of the voice and augmented reality (AR) processing". Specifically, the HMD 100 detects the direction of a visual line of the user, performs guidance by only voice when it is estimated that the object of attention is absent in the direction of the visual line, and performs guidance by the combination of the voice and the augmented reality processing when it is estimated that the object of attention is present in the direction of the visual line. Details of the guidance processing are explained below. Note that, in this embodiment, "voice" functions as "sound".

The "object of attention" means at least one real object specified out of real objects, which are objects present in the real world, and for urging the user to pay attention to the real object. The real object means any person, any animal or plant, any object (including an artificial object and a natural object), and the like. The real object can include both of a "real interest object", which is an object in which the user is interested (e.g., that the user is looking at), and a "real background object", which is an object in which the user is not interested (e.g., that the user is not looking at, although the object is within a visual field of the user). That is, a processing target of the guidance processing can be the entire real object including both of the real interest object and the real background object. A method of specifying an object of attention is explained below.

The "augmented reality processing" is processing for adding information to the real object using the HMD 100. In the augmented reality processing, information additionally displayed on the real object is referred to as "virtual object". "Additionally" has a meaning including all of meanings described below. The real object and the virtual object additionally displayed on the real object may be or may not be related.

Adding information to the real object using the virtual object.

Highlighting the real object using the virtual object.

Deleting and attenuating information (a color, a shape, etc.) of the real object using the virtual object.

A combination of any two or more of the addition, the highlighting, the deletion, and the attenuation.

The HMD 100 includes an image display section 20 that causes the user to visually recognize a virtual image in a state in which the HMD 100 is worn on the head of the user and a control section (a controller) 10 that controls the image display section 20. Note that, in the following explanation, the virtual image visually recognized by the user using the HMD 100 is referred to as "display image" as well for convenience. The HMD 100 emitting image light generated on the basis of image data is referred to as "display an image" as well.

A-1-1. Configuration of the Image Display Section

Figure 2:
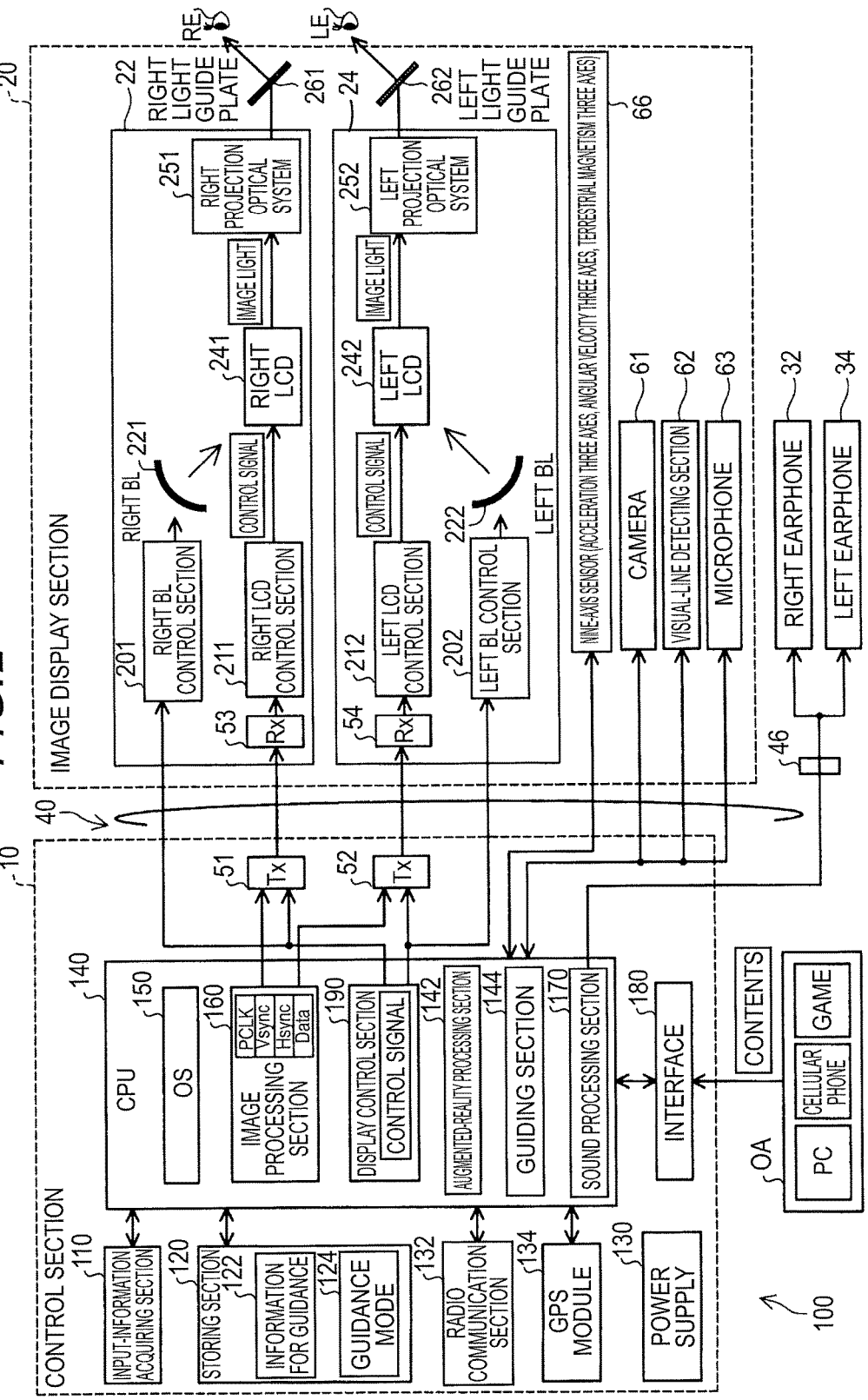
FIG. 2 is a block diagram functionally showing the configuration of the HMD.

FIG. 2 is a block diagram functionally showing the configuration of the HMD 100. The image display section 20 is a wearing body worn on the head of the user. In this embodiment, the image display section 20 has an eyeglass shape (FIG. 1). The image display section 20 includes a right holding section 21, a right display driving section 22, a left holding section 23, a left display driving section 24, a right optical-image display section 26, a left optical-image display section 28, cameras 61, visual-line detecting sections 62, a microphone 63, and a nine-axis sensor 66. In the following explanation, a positional relation and functions of the sections of the image display section 20 in a state in which the user wears the image display section 20 are explained.

As shown in FIG. 1, the right optical-image display section 26 and the left optical-image display section 28 are disposed to be respectively located in front of the right eye and in front of the left eye of the user. One end of the right optical-image display section 26 and one end of the left optical-image display section 28 are connected to each other in a position corresponding to the middle of the forehead of the user. As shown in FIG. 2, the right optical-image display section 26 includes a right light guide plate 261 and a dimming plate (not shown in the figure). The right light guide plate 261 is formed of a light-transmissive resin material or the like and guides image light output from the right display driving section 22 to a right eye RE of the user while reflecting the image light along a predetermined optical path. The dimming plate is a thin plate-like optical element and is disposed to cover the front side (a side opposite to the side of the eye of the user) of the image display section 20. The dimming plate protects the light guide plate 261 and suppresses damage, adhesion of stain, and the like to the light guide plate 261. By adjusting the light transmittance of the dimming plate, it is possible to adjust an amount of external light entering the eye of the user and adjust easiness of visual recognition of a virtual image. The dimming plate may be omitted.

The left optical-image display section 28 includes a left light guide plate 262 and a dimming plate (not shown in the figure). Details of the left light guide plate 262 and the dimming plate are the same as the details in the right optical-image display section 26. The right optical-image display section 26 and the left optical-image display section are collectively simply referred to as "optical-image display sections" as well. Any system can be used in the optical-image display sections as long as the optical-image display sections form a virtual image in front of the eyes of the user using image light. For example, the optical-image display sections may be realized using a diffraction grating or may be realized using a transreflective film.

As shown in FIG. 1, the right holding section 21 is provided to extend from the other end ER of the right optical-image display section 26 to a position corresponding to the temporal region of the user. The left holding section 23 is provided to extend from the other end EL of the left optical-image display section 28 to a position corresponding to the temporal region of the user. The right holding section 21 and the left holding section 23 hold the image display section 20 on the head of the user like temples of eyeglasses. The right holding section 21 and the left holding section 23 are collectively simply referred to as "holding sections" as well.

As shown in FIG. 1, the right display driving section 22 is disposed on the inner side of the right holding section 21 (a side opposed to the head of the user). The left display driving section 24 is disposed on the inner side of the left holding section 23. As shown in FIG. 2, the right display driving section 22 includes a receiving section (Rx) 53, aright backlight (BL) control section 201 and a right backlight (BL) 221 functioning as a light source, a right LCD (Liquid Crystal Display) control section 211 and a right LCD 241 functioning as a display device, and a right projection optical system 251. The right backlight control section 201, the right LCD control section 211, the right backlight 221, and the right LCD 241 are collectively referred to as "image-light generating sections" as well.

The receiving section 53 functions as a receiver for serial transmission between the control section 10 and the image display section 20. The right backlight control section 201 drives the right backlight 221 on the basis of an input control signal. The right backlight 221 is a light emitting body such as an LED (Light Emitting Diode) or an electroluminescence (EL) device. The right LCD control section 211 drives the right LCD 241 on the basis of a clock signal PCLK, a vertical synchronization signal VSync, a horizontal synchronization signal HSync, image data Data for the right eye input via the receiving section 53. The right LCD 241 is a transmission liquid crystal panel on which a plurality of pixels are arranged in a matrix shape. The right projection optical system 251 is a collimate lens that changes image light emitted from the right LCD 241 to light beams in a parallel state.

The left display driving section 24 includes a receiving section (Rx) 54, a left backlight (BL) control section 202 and a left backlight (BL) 222 functioning as alight source, a left LCD control section 212 and a left LCD 242 functioning as a display device, and a left projection optical system 252. Details of the sections are the same as the details in the right display driving section 22. The right display driving section 22 and the left display driving section 24 are collectively simply referred to as "display driving sections" as well.

As shown in FIG. 1, the cameras 61 are stereo cameras respectively disposed in positions corresponding to parts above the left and right outer corners of the eyes of the user. The left and right cameras 61 respectively pick up images of an outside scene (a scene on the outside) in a front side direction of the image display section 20, in other words, a visual field direction of the user in a mounted state of the HMD 100 and acquire two outside scene images corresponding to the left and the right. The cameras 61 are so-called visible light cameras. The outside scene images acquired by the cameras 61 are images representing the shape of an object from visible light radiated from the object. The cameras 61 in this embodiment are the stereo cameras. However, the cameras 61 may be monocular cameras. The cameras 61 function as an "image acquiring section".

As shown in FIG. 1, the visual-line detecting sections 62 are respectively disposed in positions corresponding to parts below the left and right outer corners of the eyes of the user. The left and right visual-line detecting sections 62 respectively include infrared-ray emitting sections and infrared-ray receiving sections not shown in the figure. The right visual-line detecting section 62 receives an infrared ray emitted from the infrared-ray emitting section, hitting the right eye of the user, and reflected on the right eye. A CPU 140 of the control section 10 acquires a motion of a visual line of the right eye of the user on the basis of the intensity of the infrared ray received by the right visual-line detecting section 62. Similarly, the left visual-line detecting section 62 receives an infrared ray emitted from the infrared-ray emitting section, hitting the left eye of the user, and reflected on the left eye. The CPU 140 detects a visual line of the left eye of the user on the basis of the intensity of the infrared ray received by the left visual-line detecting section 62. The reflectance of the infrared ray is different when the infrared ray hits the iris (the pupil), when the infrared ray hits the eyelid, and when the infrared ray hits the white of the eye. Therefore, the CPU 140 can acquire the motion of the visual line of the user according to the intensity of the infrared ray received by the visual-line detecting sections 62. In this case, the visual-line detecting sections 62 and the CPU 140 function as a "visual-line detecting section" that detects the direction of the visual line of the user. The visual-line detecting sections 62 in this embodiment are respectively provided on the left and the right. However, the visual-line detecting section 62 may be provided on one of the left and the right.

As shown in FIG. 1, the microphone 63 is a microphone disposed in a position corresponding to an upper part of the nose of the user. The microphone 63 acquires voice on the outside. The "voice" means not only voice of a person but also sound in a broader sense including machine voice and the like.

As shown in FIG. 1, the nine-axis sensor 66 is disposed in a position corresponding to the temple on the right side of the user. The nine-axis sensor 66 is a motion sensor that detects acceleration (three axes), angular velocity (three axes), and terrestrial magnetism (three axes). Since the nine-axis sensor 66 is provided in the image display section 20, when the image display section 20 is worn on the head of the user, the nine-axis sensor 66 functions as a motion detecting section that detects a motion of the head of the user of the head mounted display 100. The motion of the head includes the speed, the acceleration, the angular velocity, the direction, and a change in the direction of the head.

As shown in FIG. 1, the image display section 20 includes a connecting section 40 for connecting the image display section 20 and the control section 10. The connecting section 40 includes a main body cord 48 connected to the control section 10, a right cord 42 and a left cord 44 branching from the main body cord 48, and a coupling member 46 provided at a branching point. A jack for connecting an earphone plug 30 is provided in the coupling member 46. A right earphone 32 and a left earphone 34 extend from the earphone plug 30. The image display section 20 and the control section 10 perform transmission of various signals via the connecting section 40. As the cords of the connecting section 40, for example, a metal cable and an optical fiber can be adopted.

A-1-2. Configuration of the Control Section

The control section 10 is a device for controlling the HMD 100. As shown in FIG. 1, the control section 10 includes a determination key 11, a lighting section 12, a display switching key 13, a track pad 14, a luminance switching key 15, a direction key 16, a menu key 17, and a power switch 18. The determination key 11 detects pressing operation and outputs a signal for determining content of the operation in the control section 10. The lighting section 12 is realized by, for example, an LED and notifies, with a light emission state thereof, an operation state (e.g., ON/OFF of a power supply) of the HMD 100. The display switching key 13 detects pressing operation and outputs, for example, a signal for switching a display mode of a content moving image to 3D and 2D.

The track pad 14 detects operation by a finger of the user on an operation surface of the track pad 14 and outputs a signal corresponding to detected content. As the track pad 14, various types such as an electrostatic type, a pressure type, and an optical type can be adopted. The luminance switching key 15 detects pressing operation and outputs a signal for increasing or reducing the luminance of the image display section 20. The direction key 16 detects pressing operation on keys corresponding to the upward, downward, left, and right directions and outputs a signal corresponding to detected contents. The power switch 18 detects slide operation of the switch to switch a power supply state of the HMD 100.

As shown in FIG. 2, the control section 10 includes an input-information acquiring section 110, a storing section 120, a power supply 130, a radio communication section 132, a GPS module 134, the CPU 140, an interface 180, and transmitting sections (Tx) 51 and 52. The sections are connected to one another by a not-shown bus.

The input-information acquiring section 110 acquires signals corresponding to operation inputs to the determination key 11, the display switching key 13, the track pad 14, the luminance switching key 15, the direction key 16, the menu key 17, and the power switch 18. The input-information acquiring section 110 can acquire operation inputs by various methods other than the methods explained above. For example, the input-information acquiring section 110 may detect a gesture of the user using the cameras 61 and acquire an operation input by a command associated with the gesture. In the gesture detection, a fingertip of the user, a ring worn on a hand of the user, a medical instrument held by a hand of the user, or the like can be set as a mark for motion detection. For example, the input-information acquiring section 110 may acquire an operation input by a command associated with the visual line of the user detected by the visual-line detecting sections 62 or the motion of the eyes. The command may be set to be capable of being added by the user. For example, the input-information acquiring section 110 may acquire an operation input by voice recognition of voice acquired by the microphone 63. For example, the input-information acquiring section 110 may acquire an operation input by a not-shown foot switch (a switch operated by a foot of the user). If the operation inputs by these methods can be acquired, even during work in which it is difficult for the user to release the hands, the input-information acquiring section 110 can acquire the operation inputs from the user.

The storing section 120 is configured by a ROM, a RAM, a DRAM, a hard disk, or the like. Various computer programs such as an operating system (OS) are stored in the storing section 120. Information for guidance 122 and a guidance mode 124 are stored in the storing section 120. The information for guidance 122 is information used in guidance processing. Details of the information for guidance 122 are explained below.

The guidance mode 124 is information for designating a method of guidance in the guidance processing. As methods of the guidance in the guidance processing, there are a "mode with tracking" and a "mode without tracking". In the mode without tracking, a guiding section 144 carries out guidance to the object of attention only once. In the mode with tracking, the guiding section 144 repeatedly carries out the guidance to the object of attention according to a change with time of the object of attention. In the guidance mode 124, information representing one of the mode with tracking and the mode without tracking is stored. The user can change the content of the guidance mode 124 according to an operation input by the input-information acquiring section 110.

The power supply 130 supplies electric power to the sections of the HMD 100. As the power supply 130, for example, a secondary cell can be used.

The radio communication section 132 performs radio communication with an external apparatus according to a predetermined radio communication standard. The predetermined radio communication standard is, for example, short-range radio communication exemplified by an infrared ray and a Bluetooth (registered trademark) or a wireless LAN exemplified by IEEE802.11.

The GPS module 134 receives a signal from a GPS satellite to thereby detect the present position of the user of the HMD 100 and generates present position information representing present position information of the user. The present position information can be realized by, for example, a coordinate representing latitude and longitude.

The CPU 140 reads out and executes a computer program stored in the storing section 120 to thereby function as an augmented-reality processing section 142, the guiding section 144, an operating system (OS) 150, an image processing section 160, a sound processing section 170, and a display control section 190.

The augmented-reality processing section 142 executes augmented reality processing when guidance by a "combination of voice and augmented reality processing" is performed in the guidance processing. In the augmented reality processing, the augmented-reality processing section 142 adds a virtual object to an object of attention (a real object) and displays the virtual object. Details of the augmented-reality processing section 142 are explained below. The guiding section 144 executes the guidance processing to carry out guidance to the object of attention with "only voice" or the "combination of voice and augmented reality processing". Details of the guiding section 144 are explained below.

The image processing section 160 performs signal processing for image display. Specifically, when contents (a video) are input via the interface 180 or the radio communication section 132, the image processing section 160 generates the image data Data based on the contents. When receiving image data from another functional section of the HMD 100, the image processing section 160 sets the received image data as the image data Data. The image processing section 160 may execute, on the image data Data, image processing such as resolution conversion processing, various kinds of tone correction processing such as adjustment of luminance and chroma, and keystone correction processing. The image processing section 160 transmits the image data Data, the clock signal PCLK, the vertical synchronization signal VSync, and the horizontal synchronization signal HSync to the image display section 20 via the transmitting sections 51 and 52. The image data Data transmitted via the transmitting section 51 is referred to as "image data for right eye Data1" as well. The image data Data transmitted via the transmitting section 52 is referred to as "image data for left eye Data2" as well.

The display control section 190 generates control signals for controlling the right display driving section 22 and the left display driving section 24. Specifically, the display control section 190 individually controls, using the control signals, ON/OFF of driving of the left and right LCDs 241 and 242 by the left and right LCD control sections 211 and 212 and ON/OFF of driving of the left and right backlights 221 and 222 by the left and right backlight control sections 201 and 202 to thereby control generation and emission of image lights respectively by the right display driving section 22 and the left display driving section 24. The display control section 190 transmits the control signals to the image display section 20 via the transmitting sections 51 and 52.

The sound processing section 170 acquires a voice signal included in the contents, amplifies the acquired voice signal, and supplies the amplified voice signal to a not-shown speaker of the right earphone 32 and a not-shown speaker of the left earphone 34.

The interface 180 performs communication with an external apparatus OA according to a predetermined wire communication standard. The predetermined wire communication standard is, for example, Micro USB (Universal Serial Bus), USB, HDMI (High Definition Multimedia Interface; HDMI is a registered trademark), DVI (Digital Visual Interface), VGA (Video Graphics Array), composite, RS-232C (Recommended Standard 232), or wire LAN exemplified by IEEE802.3. As the external apparatus OA, for example, a personal computer PC, a cellular phone terminal, and a game terminal can be used.

Figure 3A:
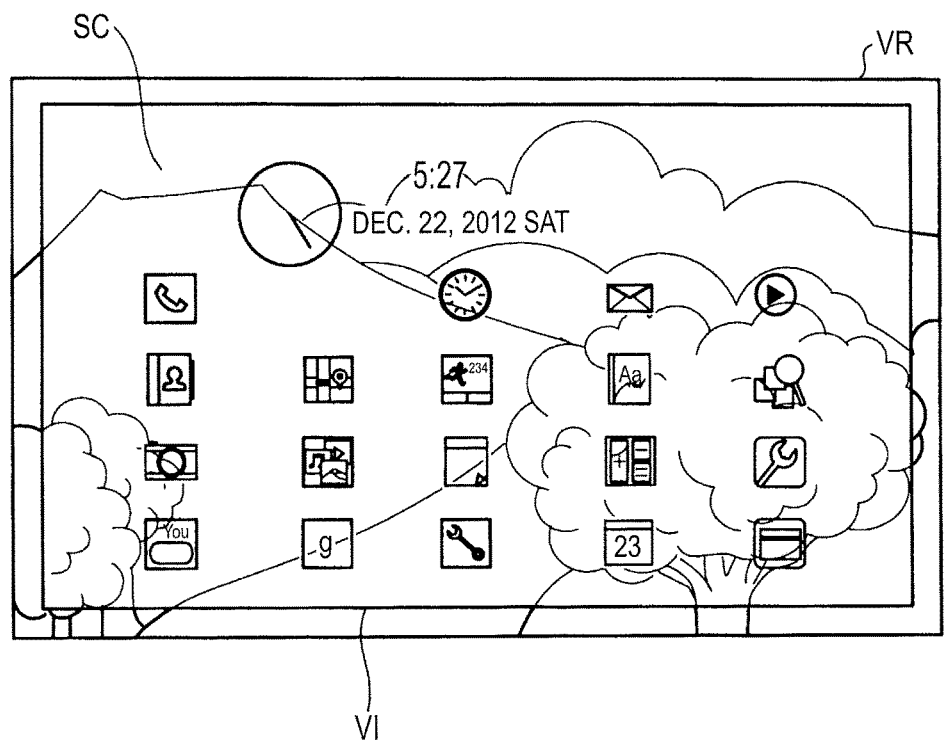
FIGS. 3A and 3B are explanatory diagrams showing an example of a virtual image visually recognized by a user.
Figure 3B:
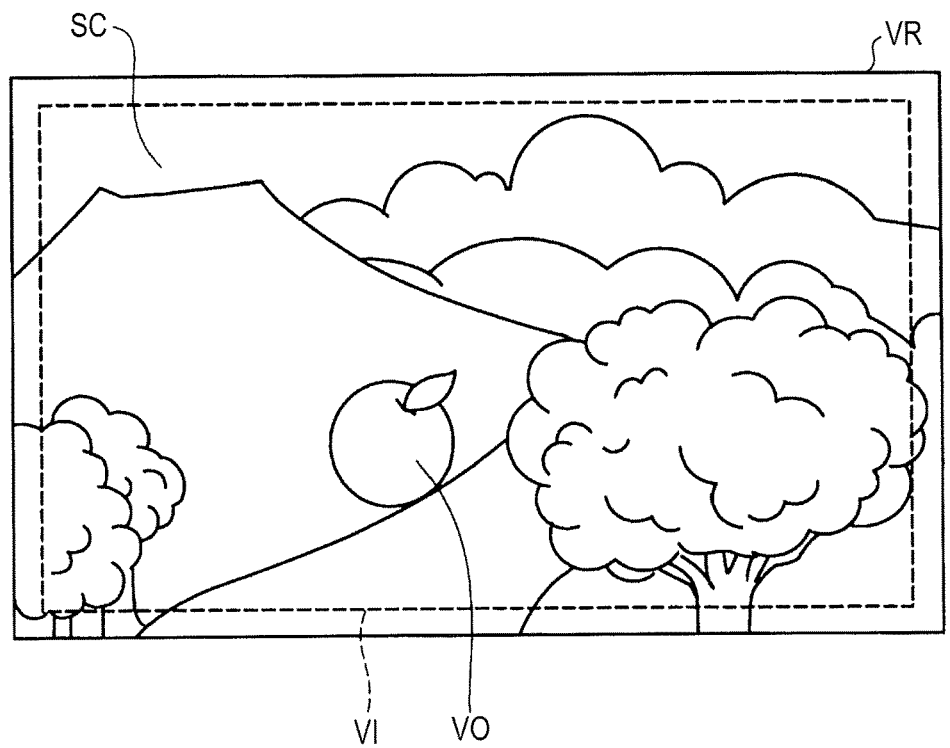

FIGS. 3A and 3B are explanatory diagrams showing an example of a virtual image visually recognized by the user. FIG. 3A illustrates a visual field VR of the user obtained when the augmented reality processing is not executed. As explained above, the image lights guided to both the eyes of the user of the HMD 100 are focused on the retinas of the user, whereby the user visually recognizes a virtual image VI. In the example shown in FIG. 3A, the virtual image VI is a standby screen of the OS 150 of the HMD 100. The user visually recognizes an outside scene SC through the right optical-image display section 26 and the left optical-image display section 28. In this way, in a portion where the virtual image VI is displayed in the visual field VR, the user of the HMD 100 in this embodiment can view the virtual image VI and the outside scene SC behind the virtual image VI. In a portion where the virtual image VI is not displayed in the visual field VR, the user can directly view the outside scene SC through the optical-image display sections.

FIG. 3B illustrates the visual field VR of the user obtained when the augmented reality processing is executed. By executing the augmented reality processing, the user visually recognizes the virtual image VI including a virtual object VO. The virtual object VO is an image of an apple disposed to be superimposed on the foot of a mountain in the outside scene SC. In this way, the user can experience the augmented reality by viewing both of the virtual object VO included in the virtual image VI and real objects in the outside scene SC seen through behind the virtual image VI.

A-2. Guidance Processing

Figure 4:
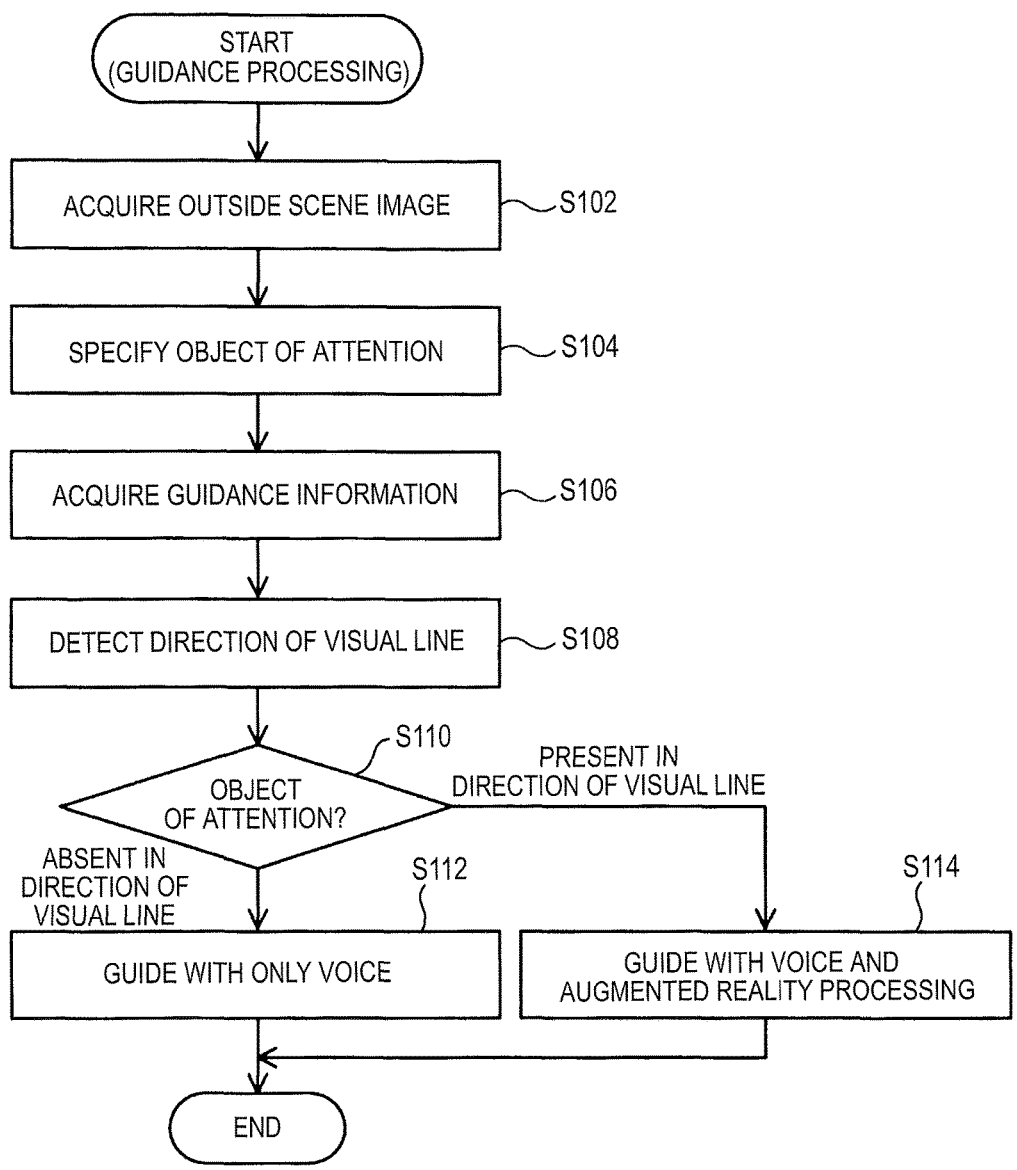
FIG. 4 is a flowchart for explaining a procedure of guidance processing.

FIG. 4 is a flowchart for explaining a procedure of the guidance processing. The guidance processing is processing for carrying out guidance to an object of attention with "only voice" or the "combination of voice and augmented reality processing". A start trigger of the guidance processing can be optionally set. For example, power-on of the HMD 100 may be set as the start trigger. A processing start request from the OS 150 of the HMD 100 or a specific application may be set as the start trigger.

In step S102, the guiding section 144 causes the cameras 61 to acquire an outside scene image.

In step S104, the guiding section 144 specifies, out of real objects included in the outside scene image acquired in step S102, at least one real object as an object of attention to which the user should be urged to pay attention. Specifically, the guiding section 144 specifies the object of attention using any one of methods a1 to a4 explained below. The methods a1 to a4 may be independently used or may be used in combination.

(a1) A Method of Specifying an Object of Attention Using a Change with Time of a Real Object The guiding section 144 recognizes the outside scene image acquired in step S102 and compares the outside scene image with models of various objects (e.g., a glass, a bottle, a human body, a car, and a tree) stored in the storing section 120 or the like in advance using pattern matching or a statistical identification method to recognize all the real objects included in the outside scene image (a procedure a11). In the procedure a11, instead of recognizing all the real objects, the guiding section 144 may recognize only a main real object. In the procedure a11, the guiding section 144 may divide the outside scene image into a plurality of regions and recognize the outside scene image. The plurality of regions may be, for example, four regions obtained by equally dividing the outside scene image into two in each of the horizontal direction and the vertical direction or may be nine regions obtained by equally dividing the outside scene image into three in each of the horizontal direction and the vertical direction.

The guiding section 144 repeats, a plurality of times, the acquisition of an outside scene image (step S102) and the recognition of real objects with respect to the acquired latest outside scene image (the procedure a11) (a procedure a12).

The guiding section 144 specifies, from a result of the procedure a12, as an object of attention, the real object having a large change with time in a repeatedly-acquired plurality of outside scene images (a procedure a13). The large change with time includes a large movement amount with time and high moving speed with time. The number of objects of attention specified here may be one or may be plural.

According to the method a1, the guiding section 144 can automatically specify the object of attention from the acquired outside scene image. In order to specify, as the object of attention, the real object having the large change with time in the repeatedly-acquired plurality of outside scene images, the guiding section 144 can specify, as the object of attention, for example, the real object having a large movement amount, high moving speed, or the like. The object of attention specified in this way is particularly suitable for guidance for danger avoidance.

(a2) A Method of Specifying an Object of Attention Using a Characteristic of a Real Object The guiding section 144 recognizes the outside scene image acquired in step S102 and compares the outside scene image with a characteristic (e.g., a characteristic of a color, a characteristic of a shape, or a characteristic of a size; the characteristic functions as a "predetermined characteristic") stored in the storing section 120 or the like in advance using the pattern matching or the statistical identification method (a procedure a21).

The guiding section 144 specifies, as an object of attention, a real object, a result of the comparison of which in the procedure a21 matches, in the outside scene image (a procedure a22). The number of objects of attention specified here may be one or may be plural.

According to the method a2, the guiding section 144 can automatically specify the object of attention from the acquired outside scene image. The guiding section 144 specifies the real object having the predetermined characteristic as the object of attention in the outside scene image. Therefore, the guiding section 144 can specify various real objects as objects of attention, for example, by preparing the "predetermined characteristic" in advance as explained above. The objection of attention specified in this way is suitable for guidance for all types such as danger avoidance, information provision, motion assistance, and work support.

(a3) A Method of Specifying an Object of Attention Using a Visual Line of the User The guiding section 144 recognizes the outside scene image acquired in step S102 and recognizes all (or main) real objects included in the outside scene image (a procedure a31). Details of the procedure a31 are the same as the procedure a11.

The guiding section 144 causes the visual-line detecting sections 62 to detect the direction of a visual line of the user. The guiding section 144 collates the real object recognized in the procedure a31 and the detected direction of the visual line and extracts the real object estimated as being present ahead in the direction of the visual line (a procedure a32).

The guiding section 144 repeats, a plurality of times, the acquisition of an outside image (step S102), the recognition of the real object with respect to the acquired latest outside scene image (the procedure a31), and the extraction of the real object estimated to be present ahead in the direction of the visual line (the procedure a32) (a procedure a33).

The guiding section 144 specifies, from a result of the procedure a33, as an object of attention, the real object estimated to be present ahead in the direction of the visual line at a high percentage in the repeatedly-acquired plurality of outside scene images and the direction of the visual line (a procedure a34). The number of objects of attention specified here may be one or may be plural.

According to the method a3, the guiding section 144 can automatically specify the object of attention from the acquired outside scene image and the detected direction of the visual line. The guiding section 144 specifies, as the object of attention, the real object estimated as being present ahead of the visual line at a high percentage in the repeatedly-acquired plurality of outside scene images and the direction of the visual line. Therefore, for example, it is possible to specify, as the object of attention, the real object often viewed by the user. The object of attention specified in this way is particularly suitable for the guidance of the types such as the information provision, the motion assistance, and the work support.

(a4) A Method of Specifying an Object of Attention Using Designation by the User The guiding section 144 recognizes the outside scene image acquired in step S102 and recognizes all (or main) real objects included in the outside scene image (a procedure a41). Details of the procedure a41 are the same as the procedure a11.

The guiding section 144 acquires an operation input from the user acquired by the input-information acquiring section 110. The guiding section 144 collates the real objects recognized in the procedure a41 and the acquired operation input and specifies, as an object of attention, the real object designated by the user (a procedure a42). The number of objects of attention specified here may be one or may be plural. As explained above, the operation input from the user via the input-information acquiring section 110 may be, for example, an input performed using a gesture, may be an input performed using a motion of the eyes, may be an input performed using voice, or may be an input performed using a footswitch.

According to the method a4, the guiding section 144 can automatically specify the object of attention from the acquired outside scene image and the acquired operation input. The guiding section 144 specifies, as the object of attention, the real object designated by the user. Therefore, the guiding section 144 can specify the object of attention reflecting an intention of the user. The object of attention specified in this way is suitable for the guidance of all the types such as the danger avoidance, the information provision, the motion assistance, and the work support.

In step S106 of FIG. 4, the guiding section 144 acquires content about which the user should be guided (hereinafter referred to as "guidance content" as well) with respect to the object of attention specified in step S104. Specifically, the guiding section 144 acquires the guidance content by searching through the information for guidance 122 using a name, a characteristic, a model, and the like of the object of attention.

FIG. 5 is a diagram showing an example of the information for guidance 122. The information for guidance 122 includes an object 1, an object 2, and the guidance content.

In the "object 1" and the "object 2", information for collation by the name, the characteristic, the model, and the like of objects of attention is stored. In an example shown in FIG. 5, names of objects of attention are stored in the object 1 and the object 2. Therefore, when the information for guidance 122 illustrated in FIG. 5 is used, in step S106 (FIG. 4) of the guidance processing, a search is carried out using the names of the objects of attention. When the search is carried out using characteristics of the objects of attention in step S106 of the guidance processing, information representing the characteristics of the objects of attention is stored in the object 1 and the object 2. When a search is carried out using models of the objects of attention in step S106 of the guidance processing, information representing the models of the objects of attention is stored in the object 1 and the object 2.

In the "guidance content", information representing contents about which the user should be guided is stored. In the example shown in FIG. 5, one or two character strings representing contents about which the user should be guided are stored in the guidance content. In FIG. 5, contents without a sign "(*)" at the ends of the character strings represent content information used in both of guidance in the mode without tracking and guidance in the mode with tracking. Contents with the sign "(*)" at the ends of the character string represent guidance information used in only the guidance in the mode with tracking. The guidance content may be stored as the character string as illustrated above, may be stored as a figure or an image, or may be stored by program data executed in the guiding section 144.

The "guidance content" can include information of b1 to b4 described below.

(b1) Guidance for calling attention of the user to the object of attention: according to the information b1, the guiding section 144 can carry out the guidance for danger avoidance for the user.

(b2) Guidance about information concerning the object of attention: according to the information b2, the guiding section 144 can carry out the guidance for the information provision to the user.

(b3) Guidance concerning the position of the object of attention: according to the information b3, the guiding section 144 can carry out the guidance of the motion assistance for the user.

(b4) Guidance concerning work content of the user to the object of attention: according to the information b4, the guiding section 144 can carry out the guidance for the work assistance for the user.

Specifically, in an example of an entry E1 in FIG. 5, when the object 1 is a "bottle" and the object 2 is a "glass", "guide the mouth of the bottle to the center of the glass (equivalent to the information b3)" in both of the mode without tracking and the mode with tracking and "guide about an amount of liquid in the glass" (equivalent to the information b2)" in the mode with tracking are described. In an example of an entry E5, when the object 1 is a "car", "guide a call for attention to the car (equivalent to the information b1)" in both of the mode without tracking and the mode with tracking and "guide about the distance to the car (equivalent to the information b2)" in the mode with tracking are stored. In this way, data does not have to be stored in the object 2.

In step S108 in FIG. 4, the guiding section 144 causes the visual-line detecting sections 62 to detect the direction of a visual line of the user.

In step S110, the guiding section 144 collates the position in the outside scene image of the object of attention specified in step S104 and the detected direction of the visual line and estimates whether the object of attention is present in the direction of the visual line.

If estimating that the object of attention is absent in the direction of the visual line (absent in the direction of the visual line in step S110), in step S112, the guiding section 144 carries out, only with voice, guidance based on the guidance content acquired in step S106. Specifically, the guiding section 144 generates or acquires voice data for the guidance and transmits the voice data to the sound processing section 170. The sound processing section 170 causes the speaker in the right earphone 32 and the speaker in the left earphone 34 to output voice based on the received voice data.

If estimating that the object of attention is present in the direction of the visual line (present in the direction of the visual line in step S110), in step S114, the guiding section 144 carries out, with a combination of the voice and the augmented reality processing, the guidance based on the guidance content acquired in step S106. A specific method of the guidance by the voice is the same as step S112. A specific method of the guidance by the augmented reality processing is as indicated by the following procedures c1 to c5.

(c1) The guiding section 144 transmits, to the augmented-reality processing section 142, the information for specifying the object of attention specified in step S104 (the name, the characteristic, the model, and the like of the object of attention) and the guidance content acquired in step S106.

(c2) The augmented-reality processing section 142 causes the cameras 61 to acquire an outside scene image. The augmented-reality processing section 142 acquires the position of the object of attention in the acquired outside scene image using the information for specifying the object of attention acquired in the procedure c1. The "position" includes the distance from the user and positions in the horizontal direction and the vertical direction in the visual field of the user. In this case, the augmented-reality processing section 142 may calculate the position of the object of attention using two or more outside scene images acquired by the cameras 61, which are the stereo cameras. The augmented-reality processing section 142 may calculate the position of the object of attention concurrently using one or more outside scene images acquired by the cameras 61 and not-shown various sensors (e.g., a depth sensor and a distance measuring sensor).

(c3) The augmented-reality processing section 142 acquires or generates, according to contents without the "(*)" sign at the ends among the guidance contents acquired in the procedure c1, an image, characters, a graphic symbol, or the like representing a virtual object to be additionally displayed on the object of attention. Examples of the image, the characters, the graphic symbol, or the like representing the virtual object include an arrow, a line, a scale, a graduation, a pointer, a shortcut, a menu, a radio button, a selection button, and a soft keyboard. The augmented-reality processing section 142 may acquire a virtual object stored in the storing section 120 in advance or may acquire a virtual object stored in advance in another device connected to the HMD 100 by a network.

(c4) The augmented-reality processing section 142 generates additional image data in which the virtual object acquired or generated in the procedure c3 disposes to be aligned with the position of the object of attention acquired in the procedure c2 and black is disposed in the other portions. In the alignment, the augmented-reality processing section 142 may use a characteristic portion (an edge or the like) of the object of attention or may use a mark such as a marker added to the object of attention. In the alignment, the augmented-reality processing section 142 may use image recognition performed using the model (or the image) of the object of attention stored in the storing section 120 in advance. In the alignment, the augmented-reality processing section 142 may be based on an instruction by the user. In disposing the virtual object, the augmented-reality processing section 142 may apply image processing such as enlargement, reduction, rotation, or color conversion to the virtual object.

(c5) The augmented-reality processing section 142 transmits an image based on the generated additional image data to the image processing section 160 and causes the optical-image display sections 26 and 28 of the image display section 20 to display the image.

After step S112 or step S114 of FIG. 4 ends, the guiding section 144 acquires the content stored in the guidance mode 124. When the content of the guidance mode 124 is the "mode without tracking", the guiding section 144 ends the guidance processing. When the content of the guidance mode 124 is the "mode with tracking", after staying on standby for any predetermined time, the guiding section 144 repeats the processing in step S102 and the processing in steps S108 to S114. In the processing of second and subsequent steps of S108 to S114, the guiding section 144 uses the object of attention specified in first processing of step S104 and the contents with the "(*)" sign at the ends among the guidance contents acquired in first processing of step S106. That is, in the second and subsequent processing, steps S104 and S106 are not executed.

A-3. Specific Examples of the Guidance Processing

A-3-1. First Specific Example

Figure 6:
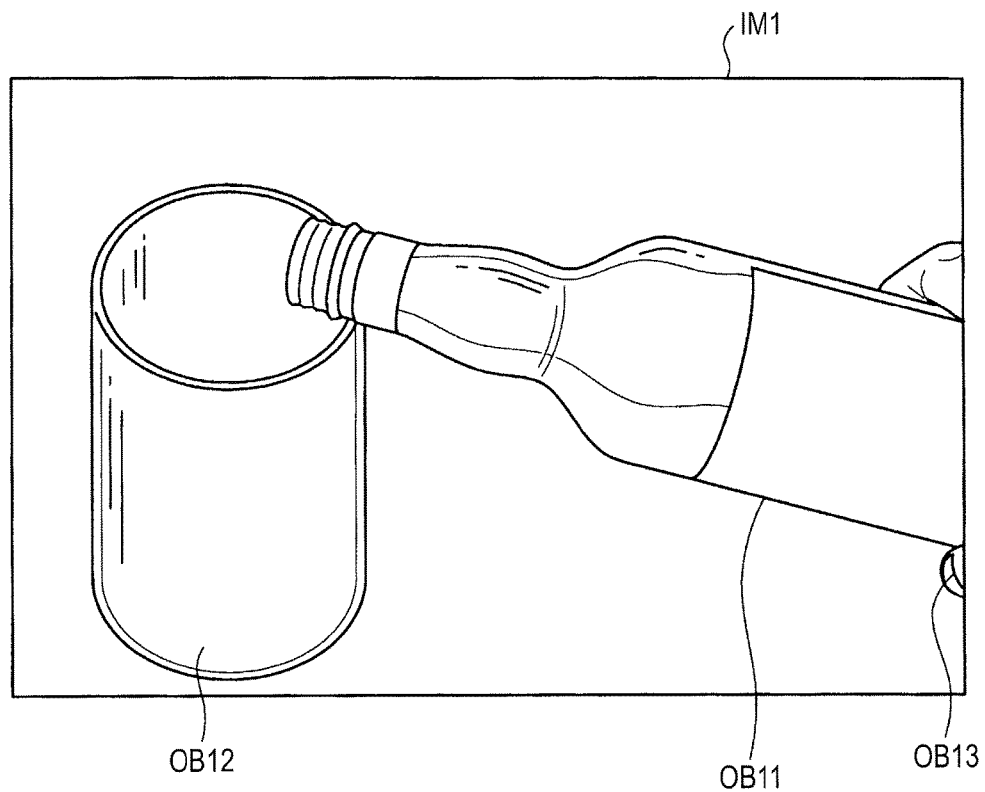
FIG. 6 is a diagram for explaining a first specific example of the guidance processing.
Figure 7:
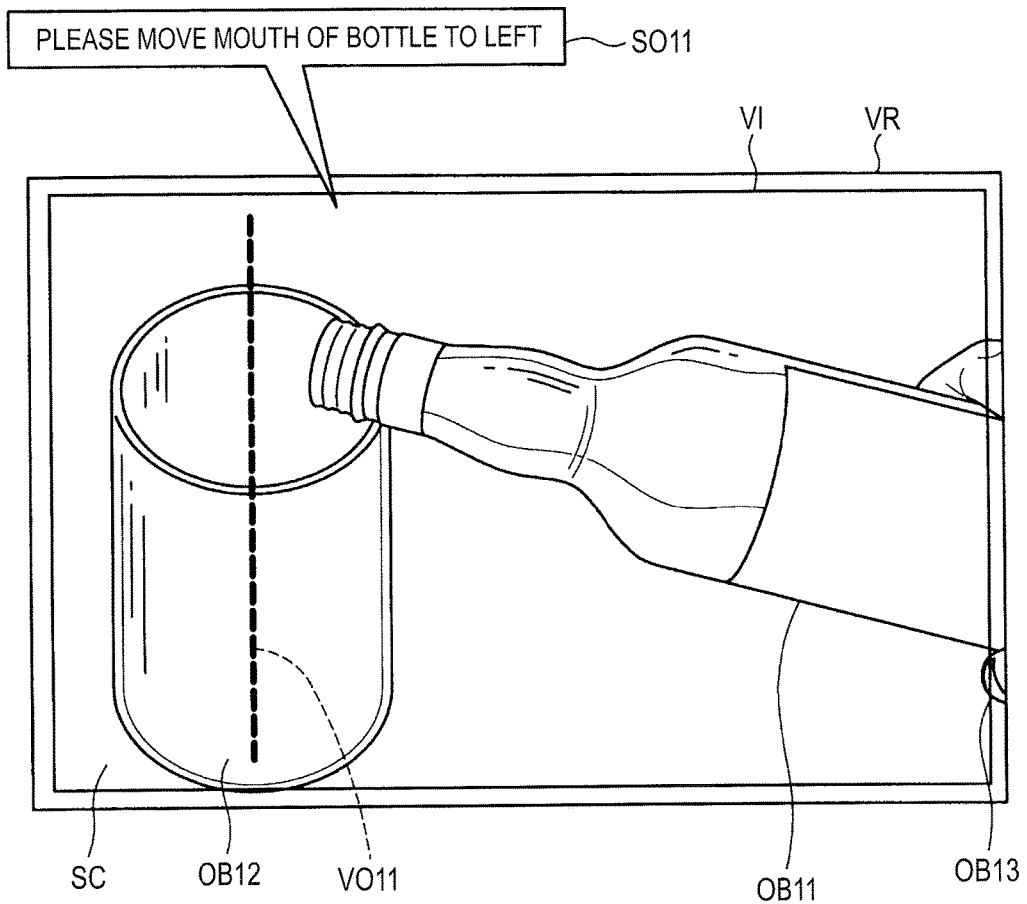
FIG. 7 is a diagram for explaining the first specific example of the guidance processing.
Figure 8:
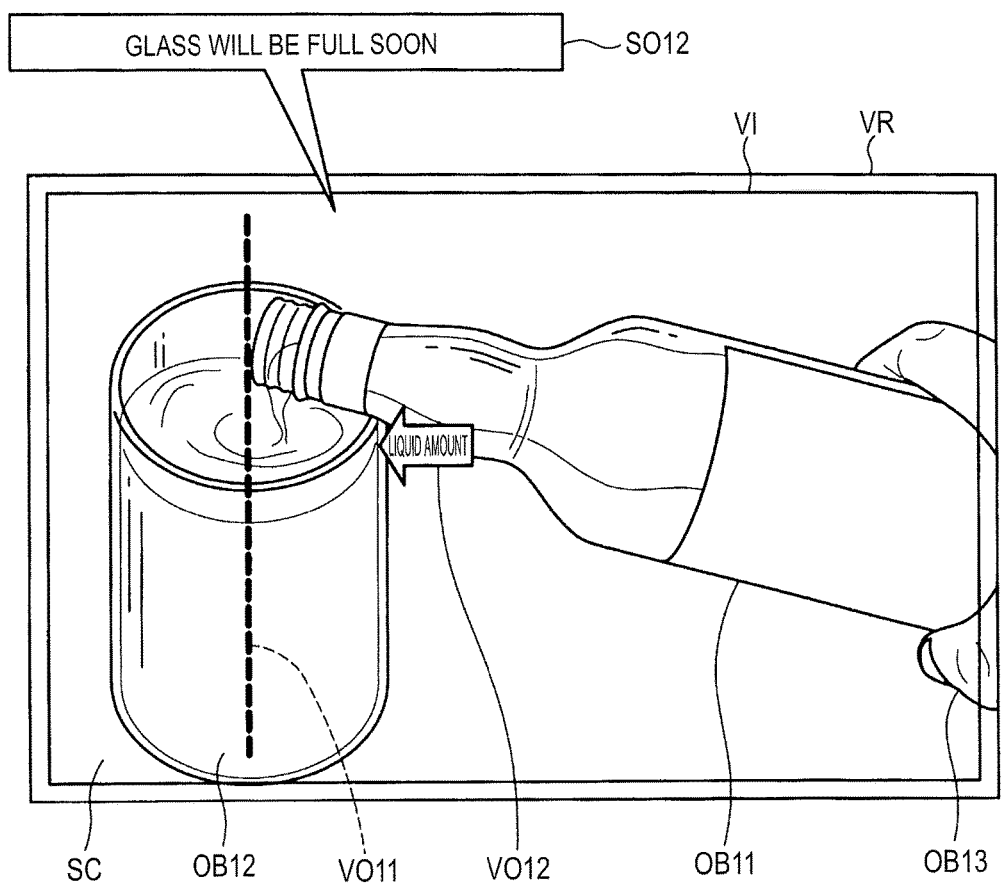
FIG. 8 is a diagram for explaining the first specific example of the guidance processing.

FIGS. 6 to 8 are diagrams for explaining a first specific example of the guidance processing. In the first specific example, the guidance processing in a scene in which the user is about to pour liquid from a bottle into a glass is explained. The first specific example is an example of the motion assistance and the information provision. In step S102 of the guidance processing (FIG. 4), the guiding section 144 acquires an outside scene image. FIG. 6 is an example of the outside scene image acquired in step S102. An outside scene image IM1 includes real objects OB11 to OB13.

In step S104 of the guidance processing, the guiding section 144 specifies objects of attention from the real objects OB11 to OB13 using any one of the methods a1 to a4 explained above. For example, it is assumed that a glass OB12 and a bottle OB11 are specified as objects of attention. In step S106 of the guidance processing, the guiding section 144 searches through the information for guidance 122 using the glass OB12 and the bottle OB11 and acquires guidance contents "guide the mouth of the bottle to the center of the glass" and "guide about an amount of liquid in the glass (*)" of the entry E1.

In step S108 of the guidance processing, the guiding section 144 detects the direction of a visual line of the user. If both of the glass OB12 and the bottle OB11 are absent in the direction of the visual line (absent in the direction of the visual line in step S110), in step S112, the guiding section 144 carries out, only with voice, guidance based on the guidance content "guide the mouth of the bottle to the center of the glass" acquired in step S106. As a result, only guidance voice S011 (FIG. 7) "please move the mouth of the bottle to the left" is reproduced from the speakers in the left and right earphones 32 and 34. The virtual image VI including the virtual object VO11 is not displayed.

If at least one of the glass OB12 and the bottle OB11 is present in the direction of the visual line (present in the direction of the visual line in step S110), in step S114, the guiding section 144 carries out, with a combination of the voice and the augmented reality processing, guidance based on the guidance content "guide the mouth of the bottler to the center of the glass" acquired in step S106. As a result, as shown in FIG. 7, the guidance voice SO11 "please move the mouth of the bottle to the left" is reproduced from the speakers in the left and right earphones 32 and 34. At the same time, the virtual image VI including the virtual object VO11 representing the center line of the glass OB12 is displayed.

When the content stored in the guidance mode 124 is the "mode without tracking", the guiding section 144 ends the processing here. When the content stored in the guidance mode 124 is the "mode with tracking", the guiding section 144 stays on standby for a predetermined time. In step S102 of the second guidance processing, the guiding section 144 acquires an outside scene image.

In step S108 of the second guidance processing, the guiding section 144 detects the direction of a visual line of the user. If both of the glass OB12 and the bottle OB11 are absent in the direction of the visual line (absent in the direction of the visual line in step S110), in step S112 of the second guidance processing, the guiding section 144 carries out, only with voice, guidance based on the guidance content "guide about an amount of liquid in the glass (*)" acquired in step S106. As a result, only guidance voice SO12 (FIG. 8) "the glass will be full soon" is reproduced from the speakers in the left and right earphones 32 and 34. The virtual image VI including a virtual object VO12 is not formed.

If at least one of the glass OB12 and the bottle OB11 is present in the direction of the visual line (present in the direction of the visual line in step S110), in step S114 of the second guidance processing, the guiding section 144 carries out, with a combination of the voice and the augmented reality processing, guidance based on the guidance content "guide about an amount of liquid in the glass (*)" acquired in step S106. As a result, as shown in FIG. 8, the guidance voice SO12 "the glass will be full soon" is reproduced from the speakers in the left and right earphones 32 and 34. At the same time, the virtual image VI including the virtual object VO11 representing the center line of the glass OB12 and the virtual object VO12 indicating the present liquid amount with an arrow is displayed.

A-3-2. Second Specific Example

Figure 9:
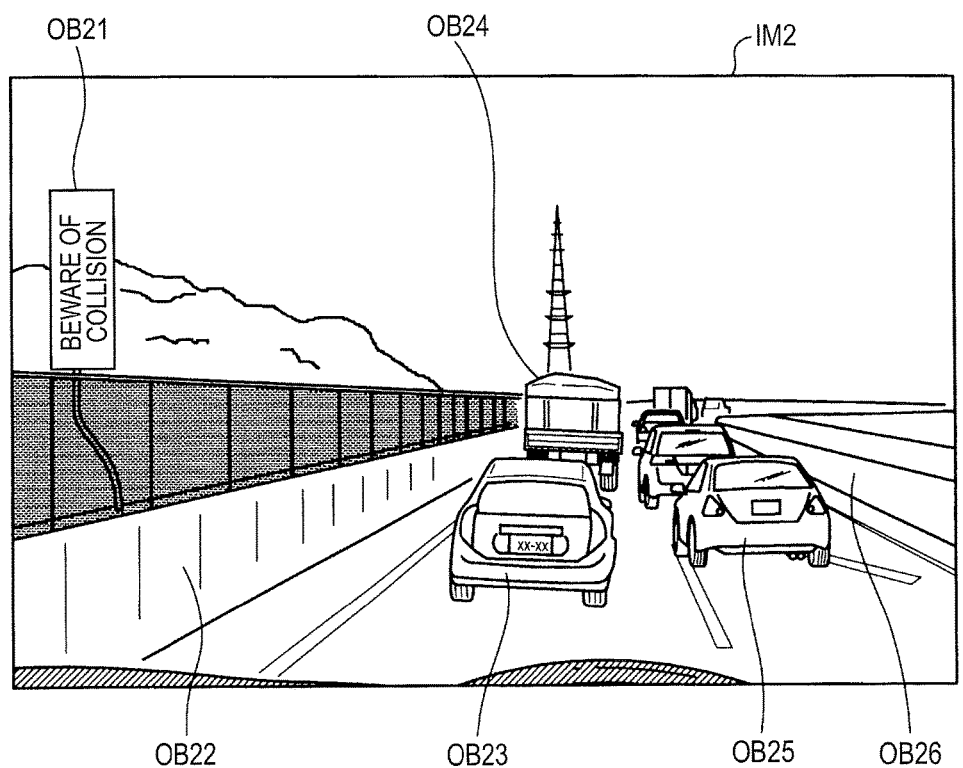
FIG. 9 is a diagram for explaining a second specific example of the guidance processing.
Figure 10:
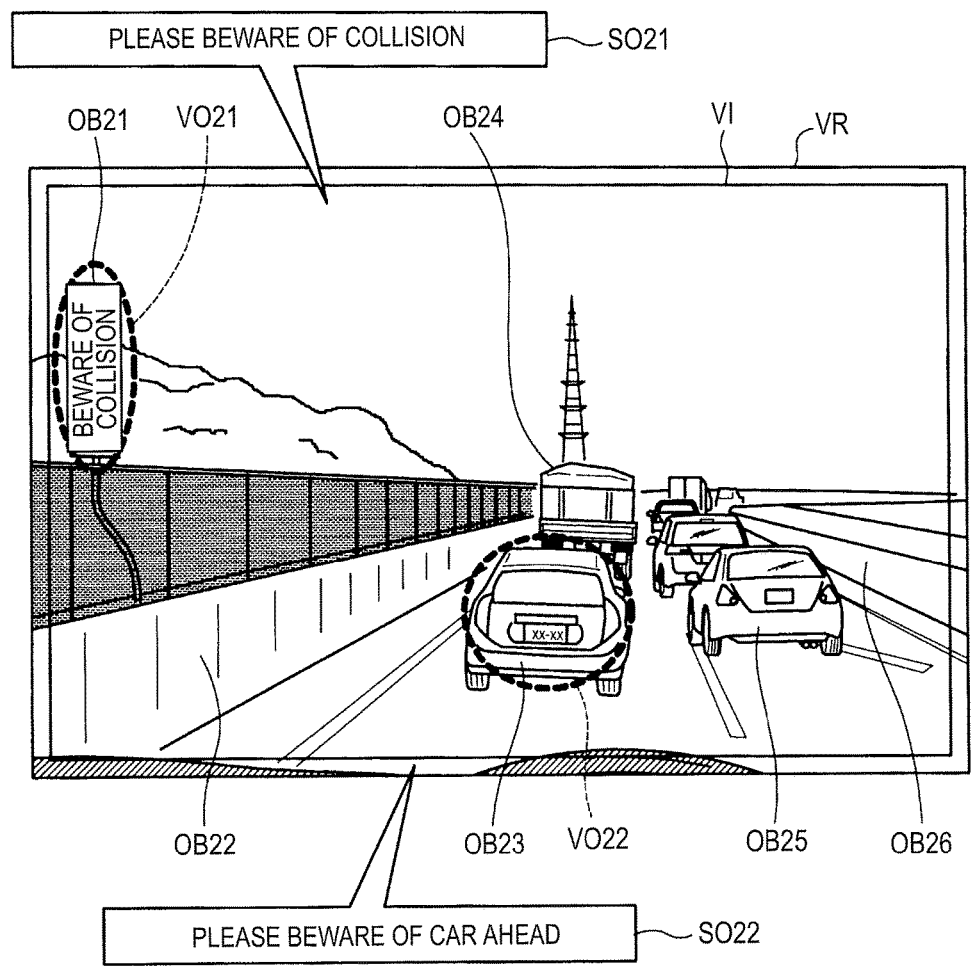
FIG. 10 is a diagram for explaining the second specific example of the guidance processing.
Figure 11:
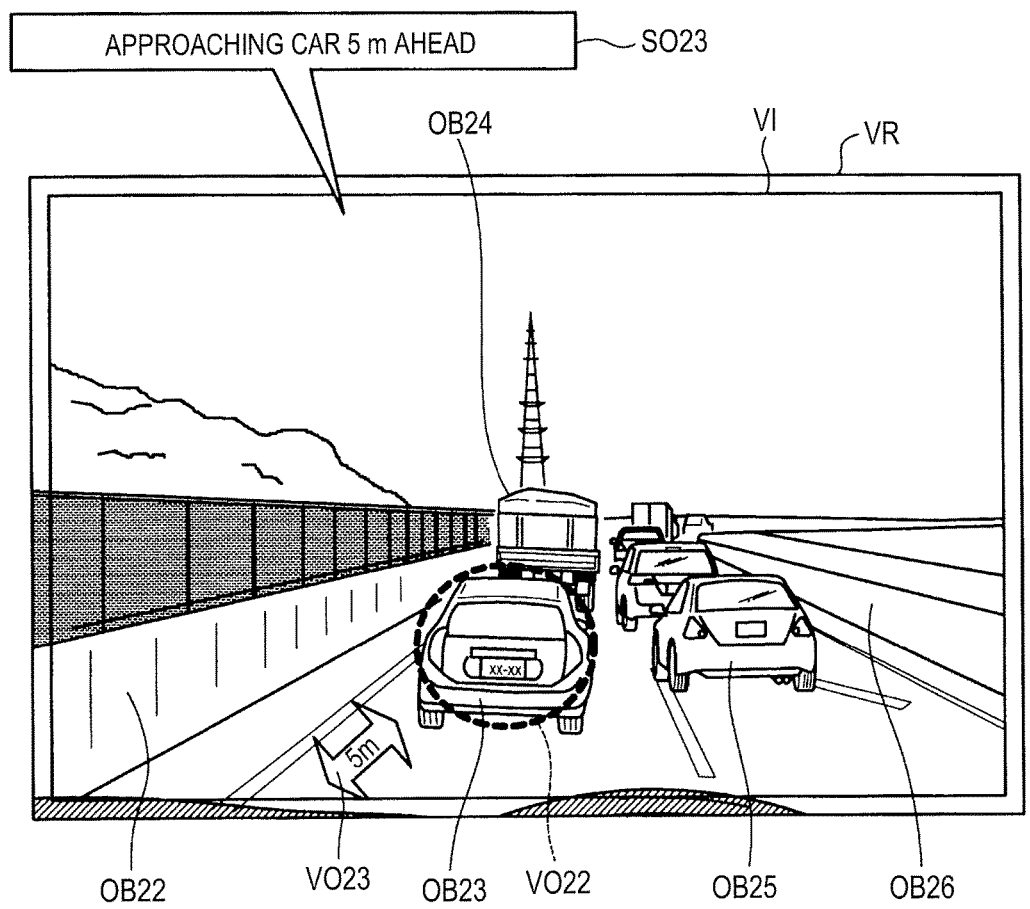
FIG. 11 is a diagram for explaining the second specific example of the guidance processing.

FIGS. 9 to 11 are diagrams for explaining a second specific example of the guidance processing. In the second specific example, the guidance processing in a scene in which the user is driving a car is explained. The second specific example is an example of the danger avoidance and the information provision. In step S102 of the guidance processing (FIG. 4), the guiding section 144 acquires an outside scene image. FIG. 9 is an example of the outside scene image acquired in step S102. An outside scene image IM2 includes real objects OB21 to OB26.

In step S104 of the guidance processing, the guiding section 144 specifies objects of attention from the real objects OB21 to OB26 using any one of the methods a1 to a4 explained above. For example, it is assumed that a signboard OB21 and a car OB23 are specified as the objects of attention. In step S106 of the guidance processing, the guiding section 144 searches through the information for guidance 122 using the signboard OB21 and the car OB23 and acquires guidance contents "guide a call for attention to the signboard" and "guide about content of the signboard" of an entry E8 and guidance contents "guide a call for attention to the car" and "guide about the distance to the car (*)" of an entry E5.

In step S108 of the guidance processing, the guiding section 144 detects the direction of a visual line of the user. If the signboard OB21 is absent in the direction of the visual line (absent in the direction of the visual line in step S110), in step S112, the guiding section 144 carries out, only with voice, guidance based on the guidance contents "guide a call for attention to the signboard" and "guide about content of the signboard" acquired in step S106. As a result, only guidance voice SO21 (FIG. 10) "please beware of collision" is reproduced from the speakers in the left and right earphones 32 and 34. The virtual image VI including a virtual object VO21 is not displayed. If the car OB23 is absent in the direction of the visual line (absent in the direction of the visual line in step S110), in step S112, the guiding section 144 carries out, only with voice, guidance based on the guidance content "guide a call for attention to the car" acquired in step S106. As a result, only guidance voice SO22 (FIG. 10) "please beware of the car ahead" is reproduced from the speakers in the left and right earphones 32 and 34. The virtual image VI including a virtual object VO22 is not displayed.

If the signboard OB21 is present in the direction of the visual line (present in the direction of the visual line in step S110), in step S114, the guiding section 144 carries out, with a combination of the voice and the augmented reality processing, guidance based on the guidance contents "guide a call for attention to the signboard" and "guide about content of the signboard" acquired in step S106. As a result, as shown in FIG. 10, the guidance voice SO21 "please beware of collision" is reproduced from the speakers in the left and right earphones 32 and 34. At the same time, the virtual image VI including the virtual object VO21 for highlighting the signboard OB21 is displayed. If the car OB23 is present in the direction of the visual line (present in the direction of the visual line in step S110), in step S114, the guiding section 144 carries out, with a combination of the voice and the augmented reality processing, guidance based on the guidance content "guide a call for attention to the car" acquired in step S106. As a result, as shown in FIG. 10, the guidance voice SO22 "please beware of the car ahead" is reproduced from the speakers in the left and right earphones 32 and 34. At the same time, the virtual image VI including the virtual object VO22 for highlighting the car OB23 is displayed.

When the content stored in the guidance mode 124 is the "mode without tracking", the guiding section 144 ends the processing here. When the content stored in the guidance mode 124 is the "mode with tracking", the guiding section 144 stays on standby for a predetermined time. In step S102 of the second guidance processing, the guiding section 144 acquires an outside scene image. Since the signboard OB is not included in the acquired outside scene image, the guiding section 144 excludes the signboard OB21 from the objects of attention in the second guidance processing.

In step S108 of the second guidance processing, the guiding section 144 detects the direction of a visual line of the user. If the car OB23 is absent in the direction of the visual line (absent in the direction of the visual line in step S110), in step S112 of the second guidance processing, the guiding section 144 carries out, only with voice, guidance based on the guidance content "guide about the distance to the car (*)" acquired in step S106. As a result, only guidance voice SO23 (FIG. 10) "approach the car 5 m ahead" is reproduced from the speakers in the left and right earphones 32 and 34. The virtual image VI including the virtual object VO21 is not displayed.

If the car OB23 is present in the direction of the visual line (present in the direction of the visual line in step S110), in step S114 of the second guidance processing, the guiding section 144 carries out, with a combination of the voice and the augmented reality processing, guidance based on the guidance content "guide about the distance to the car (*)" acquired in step S106. As a result, as shown in FIG. 10, the guidance voice SO23 "approach the car 5 m ahead" is reproduced from the speakers in the left and right earphones 32 and 34. At the same time, the virtual image VI including the virtual object VO22 for highlighting the car OB23 and a virtual object VO23 indicating the distance between the user and the car OB23 is displayed.

As explained above, with the guidance processing in the embodiment, the guiding section 144 can carry out, with at least the voices SO11 to SO23, guidance to the object of attention, which is at least one real object present in the real world and included in the outside scene image acquired in step S102 and is a real object to which the user is urged to pay attention (steps S112 and S114). Compared with guidance performed using the virtual image VI formed in the visual field area of the user, the guidance performed using the voices SO11 to SO23 can reduce the likelihood that a visual field of the user is narrowed, in other words, the likelihood that the visibility of the real world is deteriorated. As a result, it is possible to provide the head-mounted display device (the HMD 100) capable of urging the user to pay attention to the real object present in the real world while securing the visibility of the real world.

Further, with the guidance processing in the embodiment, if it is estimated that the object of attention is absent in the direction of the visual line of the user (absent in the direction of the visual line in step S110), the guiding section 144 carries out guidance only with the voices SO11 to SO23 (step S112). Therefore, the guiding section 144 can suppress the virtual image VI from being formed in the visual field area of the user for guidance to the object of attention absent in the direction of the visual line and can secure the visibility of the real world. On the other hand, if it is estimated that the object of attention is present in the visual line of the user (present in the direction of the visual line in step S110), the guiding section 144 carries out guidance by, in addition to the voices SO11 to SO23, forming the virtual image VI including the virtual objects VO11 to VO23 to be additionally displayed on the object of attention (step S114). Therefore, the guiding section 144 can elaborately perform, using both of the voices SO11 to SO23 and the virtual image VI, the guidance to the object of attention present in the direction of the visual field. That is, concerning the object of attention present in the direction of the visual line of the user, the user can enjoy the guidance via the visual sense and the auditory sense. As a result, in the head-mounted display device (the HMD 100) capable of, while securing the visibility of the real world, urging the user to pay attention to the real object present in the real world, it is possible to further improve user convenience.

Further, with the guidance processing in the embodiment, when the guidance mode 124 is the "mode with tracking", the guiding section 144 repeatedly carries out the guidance in step S112 or step S114 according to a change with time of the object of attention in the plurality of outside scene images repeatedly acquired in step S102. As a result, the guiding section 144 can perform, at any time, guidance corresponding to the latest state of the object of attention. In other words, the guiding section 144 can perform the guidance while tracking the object of attention.

A-4. Variations of the Guidance Processing

The guidance processing explained with reference to FIG. 4 is only an example and various variations of the guidance processing are possible. For example, various variations explained as variations 1 to 6 below may be applied. The variations 1 to 6 may be independently adopted or may be adopted in combination for the guidance processing.

A-4-1. Variation 1 (a Method of Designating an Object of Attention)

In a variation 1, a real object designated by the user using, for example, a part of the body is specified as an object of attention. In the variation 1, in the method a4 (the method of specifying an object of attention using designation by the user), procedures explained below are executed instead of the procedures explained above.

Figure 12:
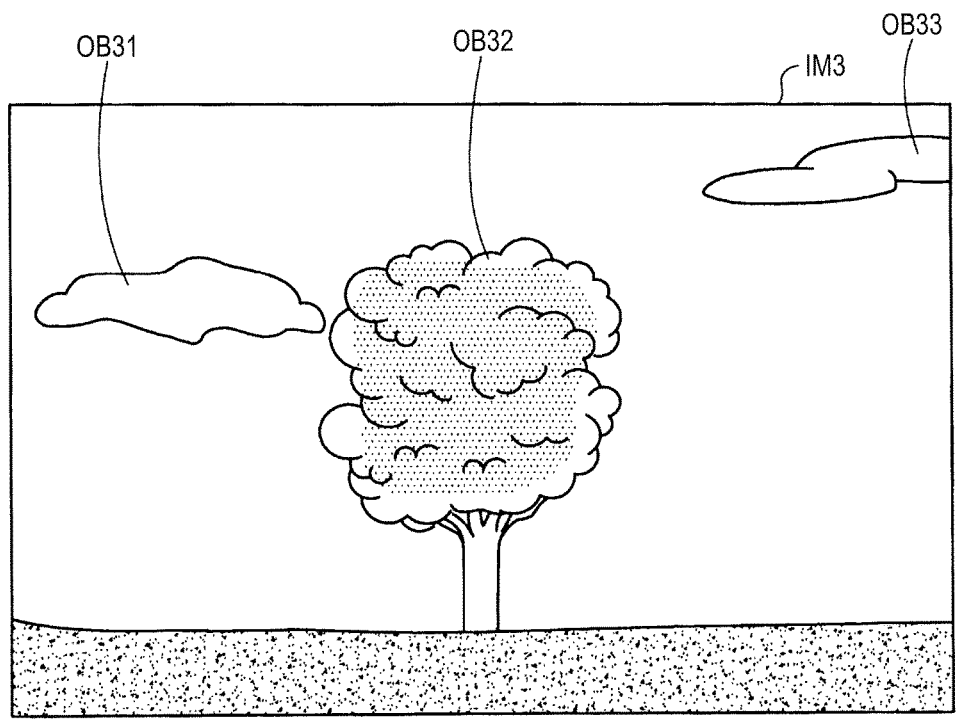
FIG. 12 is a diagram for explaining a variation 1 of the guidance processing.
Figure 13:
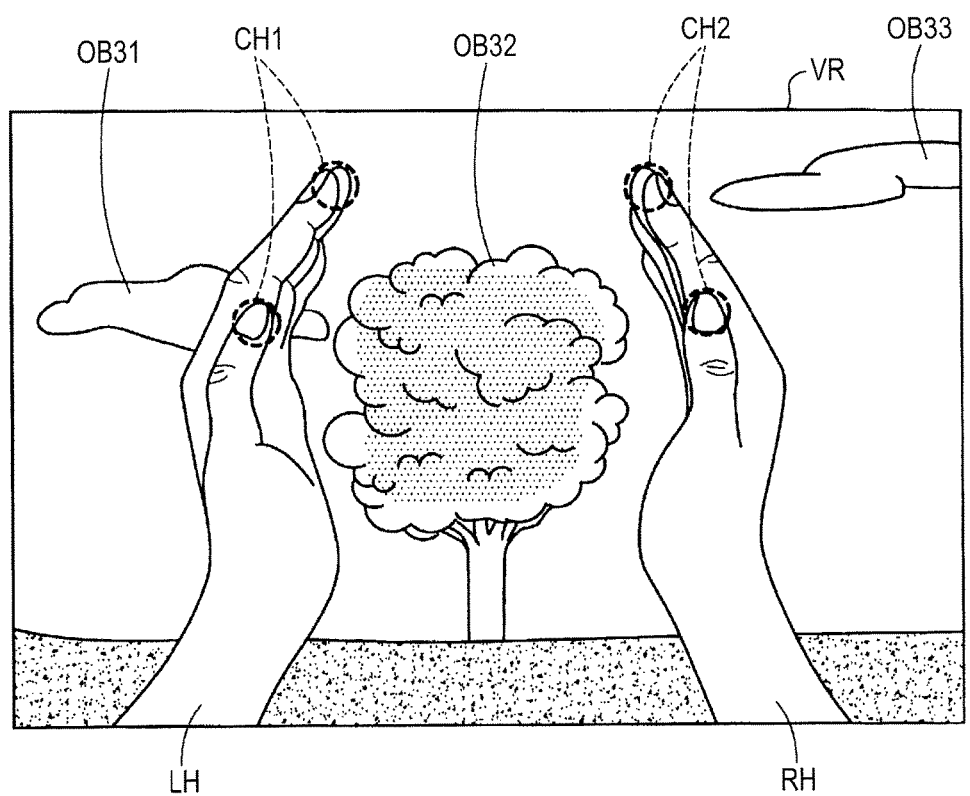
FIG. 13 is a diagram for explaining the variation 1 of the guidance processing.

FIGS. 12 and 13 are diagrams for explaining the variation 1 of the guidance processing.

The guiding section 144 recognizes the outside scene image acquired in step S102 and recognizes all (or main) real objects included in the outside scene image (the procedure a41). Details of the procedure a41 are the same as the details of the procedure a11. For example, FIG. 12 shows an example of an outside scene image IM3 acquired in step S102. The guiding section 144 recognizes real objects OB31 to OB33 included in the outside scene image IM3 according to the procedure a41.

As explained above, the input-information acquiring section 110 can detect a motion of, for example, a part of the body (e.g., an entire hand, a fingertip, a palm, an arm, a ring or a bracelet attached to the hand or the arm, or a tool held by the hand) of the user using outside scene images photographed over time (repeatedly) by the cameras 61. The guiding section 144 specifies, out of the real objects recognized in the procedure a41, one or more real objects intended by the user according to the motion of, for example, the part of the body of the user detected by the input-information acquiring section 110 and specifies the one or more real objects as objects of attention (the procedure a42). The "real object intended by the user" means a real object that the user desires to designate as an object of attention. The guiding section 144 can grasp the intention of the user according to, for example, a wrapping action by both hands or one hand, a pointing action, or a pointing action by a tool or the like. For example, in an example shown in FIG. 13, the guiding section 144 specifies, as the object of attention, the real object OB32 wrapped by a right hand RH and a left hand LH of the user. Note that, when detecting the motion of, for example, the part of the body of the user, the input-information acquiring section 110 may use a characteristic point such as a part of the body of the user (e.g., fingertips CH1 and CH2, a ring, a bracelet, or a distal end of a tool such as a pointer) as a mark for the motion detection.

According to the variation 1, the guiding section 144 can automatically specify the object of attention from the acquired outside scene image and the motion of, for example, the part of the body of the user. Therefore, the user can intuitively designate the object of attention by performing an action of, for example, holding or pointing an intended real object. As a result, according to the variation 1, it is possible to specify the object of attention reflecting the intention of the user and improve user convenience. The object of attention specified in this way is suitable for the guidance of all the types such as the danger avoidance, the information provision, the motion assistance, and the work support.

A-4-2. Variation 2 (a Method of Designating an Object of Attention)

In a variation 2, in the configuration of the variation 1, a virtual image for assisting designation of an object of attention by the user is further displayed.

Figure 14:
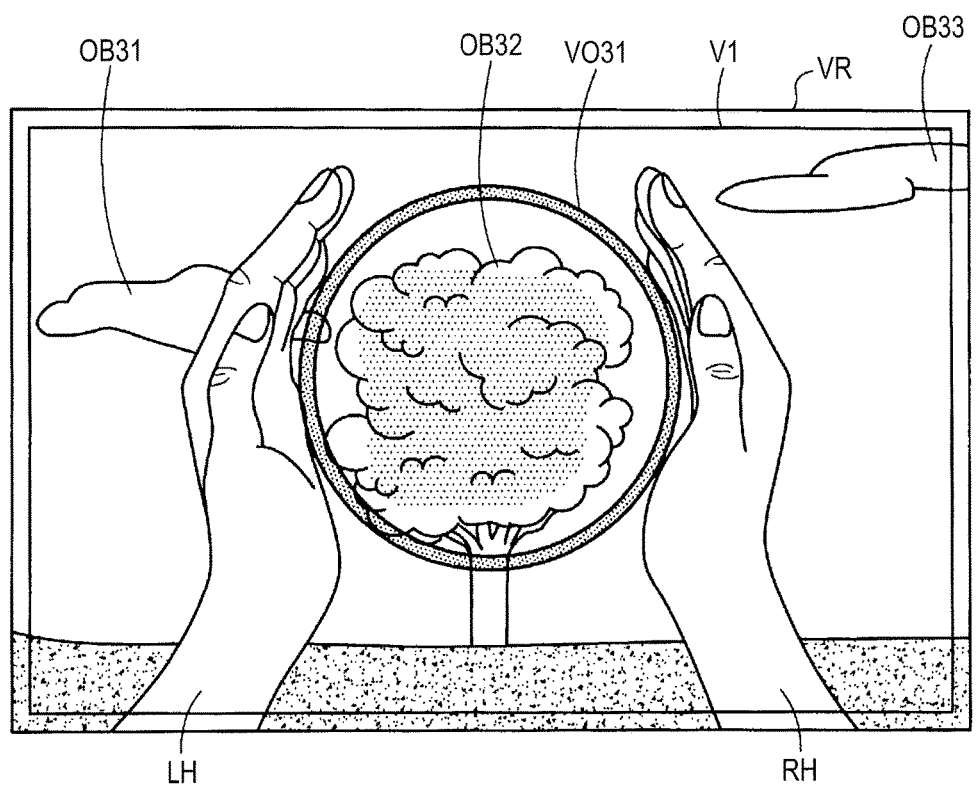
FIG. 14 is a diagram for explaining a variation 2 of the guidance processing.

FIG. 14 is a diagram for explaining the variation 2 of the guidance processing. The virtual image VI includes a virtual object VO31 serving as a mark for pointing a real object designated as an "object of attention" by the user among real objects within the visual field VR of the user. A form and a shape of the virtual object VO31 can be optionally set. As the form of the virtual object VO31, forms such as a frame surrounding the real object, a cover superimposed on the real object, and a pointer for pointing the real object can be adopted. As the shape of the virtual object VO31, a circle, a triangle, a square, and the like can be adopted. In an example shown in FIG. 14, the virtual object VO31 is set as a frame of a circle surrounding the real object.

In an initial state (i.e., immediately after the start of the procedure a42), the guiding section 144 displays the virtual object VO31 having a default size in a default position. Thereafter, the guiding section 144 changes at least any one of the position, the size, and the shape of the virtual object VO31 to follow the motion of, for example, the part of the body of the user in the procedure a42. The default position can be set as, for example, a predetermined position (the center, etc.) on a screen or a position overlapping any real object on the screen. In the example shown in FIG. 14, the guiding section 144 changes the position and the size of the virtual object VO31 to follow the motion of the right hand RH and the left hand LH of the user. For example, if a circle formed by the right hand RH and the left hand LH gradually decreases (increases) in size, the guiding section 144 gradually reduces (increases) the diameter of the virtual object VO31. Further, if the right hand RH and the left hand RH move upward (downward), the guiding section 144 moves the virtual object VO31 upward (downward) to follow the movement of the right hand RH and the left hand LH.

According to the variation 2, the guiding section 144 displays the virtual image VI for assisting the designation of an object of attention by the user. Therefore, the user can designate the object of attention using, as a mark, the virtual object VO31 displayed as the virtual image VI while checking, out of a plurality of real objects present within the visual field VR, a real object that the user intends to designate as the "object of attention". As a result, according to the variation 2, it is possible to realize further improvement of user convenience.

A-4-3. Variation 3 (an Instruction by Voice)

A variation 3 makes it possible to designate an object of attention and designate guidance content with voice.

FIG. 15 is a diagram showing an example of information for guidance 122*a* in the variation 3. The information for guidance 122*a* is different from the information for guidance 122 shown in FIG. 5 only in that types of the guidance contents are stored in association with the guidance contents (the character strings representing the contents about which the user should be guided). In this variation, a call for attention, information, position, and work content are assumed as the types of the guidance contents. The guidance contents with which the "call for attention" is associated as the type mean guidance for danger avoidance for the user. Similarly, the guidance contents with which the "information" is associated as the type mean guidance for information provision to the user. The guidance contents with which the "position" is associated as the type mean guidance for motion assistance for the user. The guidance contents with which the "work content" is associated as the type mean guidance for work support for the user.

As explained above, the input-information acquiring section 110 can acquire an operation input by voice from the user by recognizing voice acquired by the microphone 63. Therefore, in step S104 of the guidance processing shown in FIG. 4, the guiding section 144 can specify, as the "object of attention", a real object designated by voice (the method a4). Further, the guiding section 144 can limit the guidance contents acquired and guided in steps S106 to S114 to the types designated by voice (the call for attention, the information, the position, and the work content).

The guiding section 144 may acquire, with voice, additional information concerning the guidance contents in steps S106 to S114. As the additional information, for example, a type of liquid stored in the bottle (whether the liquid is carbon acid), the height of the user, and the size of tires attached to the car are assumed. In particular, in the case of the "mode with tracking", the guiding section 144 can change, according to the acquired additional information, safety coefficients in an amount of liquid and the distance to an object (a car, a person, a wall, etc.) to be guided about. Specifically, when the type of the liquid is the carbon acid, the guiding section 144 can increase the safety coefficient compared with when the type of the liquid is not the carbon acid. Similarly, the guiding section 144 can increase the safety coefficient as the height of the user increases. The guiding section 144 can increase the safety coefficient as the size of the tires increases. Consequently, the guiding section 144 can more accurately carry out guidance taking into account the additional information given by the user. Note that the additional information can be given by not only voice but also various input means (a key input, a gesture, a visual line, etc.) realized by the input-information acquiring section 110.

Further, the guiding section 144 may acquire, with voice, designation of one or more real objects out of the plurality of real objects specified by the motion of, for example, the part of the body of the user in the variations 1 and 2. For example, it is assumed that, in the example shown in FIG. 13, the real objects OB31 and OB32 are wrapped by both the hands. When the user utters "tree" in that state, the guiding section 144 specifies the real object OB32 as the target object. The guiding section 144 may acquire, with voice, designation of a real object in the default position where the virtual object VO31 (the virtual object serving as the mark for pointing the real object designated as the object of attention by the user) in the variation 2. For example, in the example shown in FIG. 14, when the user utters "cloud on the right side", the guiding section 144 displays the virtual image VI in which the virtual object VO31 is disposed in a position superimposed on the real object OB33. Consequently, it is possible to designate the object of attention with the motion of the body and the voice. Therefore, it is possible to further improve user convenience.

According to the variation 3, the guiding section 144 can execute the guidance processing according to the instruction by voice. Therefore, since the user can perform an operation input even during work in which it is difficult for the user to release the hands, it is possible to improve user convenience.

A-4-4. Variation 4 (an Instruction by a Small Input Device)

A fourth variation 4 makes it possible to designate an object of attention and designate guidance content using a small input device (hereinafter simply referred to as "input device" as well) provided separately from the HMD 100.

Figure 16:
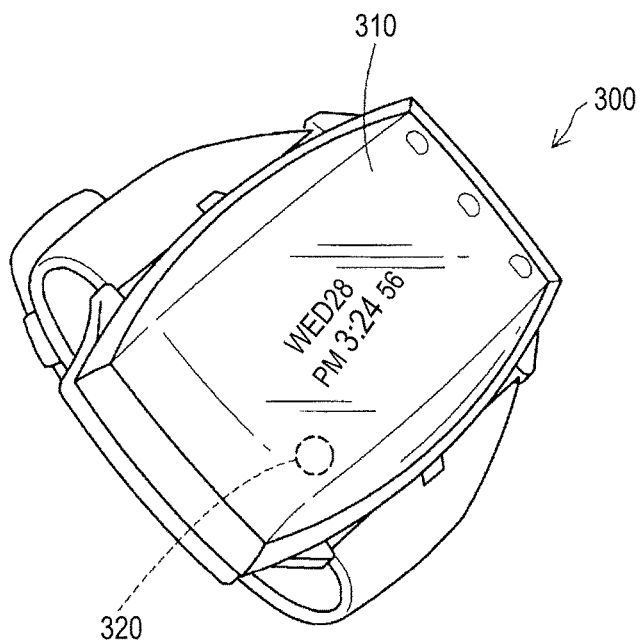
FIG. 16 is a diagram showing an example of an input device.
Figure 17:
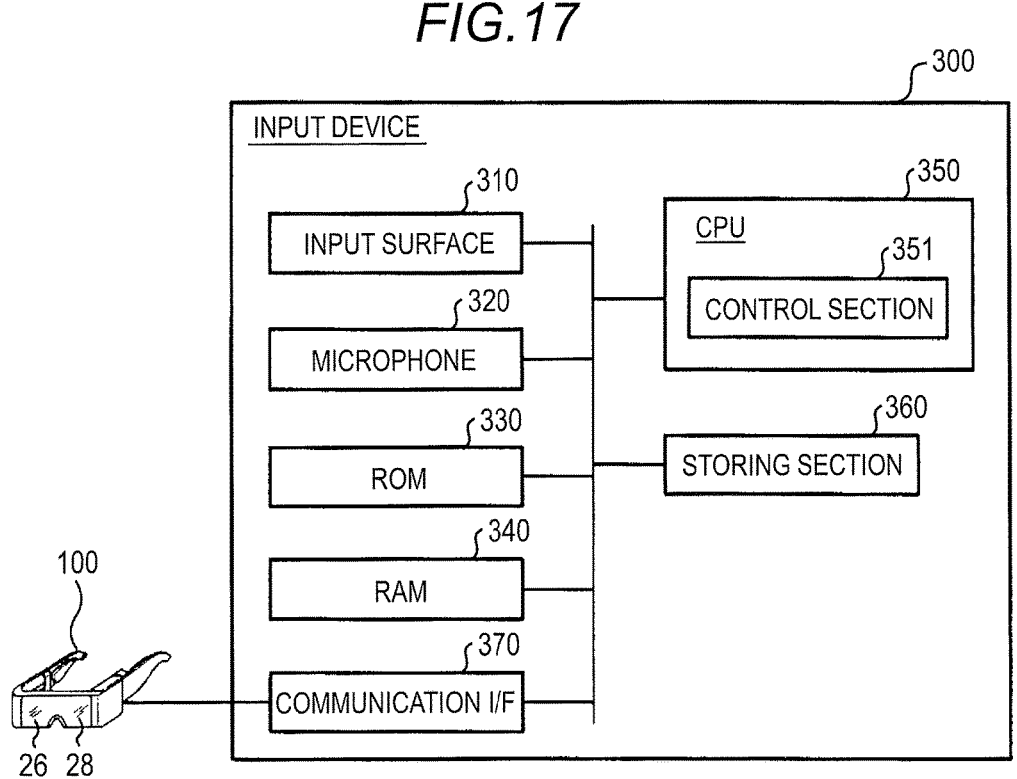
FIG. 17 is a block diagram functionally showing the configurations of the input device.

FIG. 16 is a diagram showing an example of the input device. FIG. 17 is a block diagram functionally showing the configuration of the input device. An input device 300 in this variation has a watch shape and includes an input surface 310, a microphone 320, a ROM 330, a RAM 340, a CPU 350, a storing section 360, and a communication interface 370. The input surface 310 is a touch panel formed by combining a display device such as a liquid crystal panel and a position input device such as a touch pad. The input surface 310 detects information concerning a position touched by the user. The input surface 310 is disposed over the entire surface of a case upper part of the input device 300. The microphone 320 is incorporated in the case of the input device 300. The storing section 360 is configured by a ROM, a RAM, a DRAM, a hard disk, or the like.

The CPU 350 reads out and executes a computer program stored in the storing section 360 to thereby function as a control section 351. The control section 351 realizes functions described in d1 to d3 below.

(d1) The control section 351 performs pairing with the HMD 100. The control section 351 causes the storing section 360 to store information concerning the paired HMD 100. Thereafter, the control section 351 interrupts execution of the function a2 and execution of input processing between the control section 351 and other HMDs 100.

(d2) The control section 351 displays a status of the paired HMD 100 on the input surface 310. The status is, for example, presence or absence of mail arrival, presence or absence of an incoming telephone call, battery remaining power, a state of an application executed in the HMD 100, or the like.

(d3) The control section 351 transmits content of input operation performed on the input surface 310 to the HMD 100 via the communication interface 370. The control section 351 transmits content of input operation acquired by recognizing voice acquired by the microphone 320 to the HMD 100 via the communication interface 370.

The configuration of the variation 4 includes the information for guidance 122*a* shown in FIG. 15 instead of the information for guidance 122 shown in FIG. 5. In the variation 4, as in the variation 3, the guiding section 144 can acquire, from the input device 300, the designation of an object of attention in step S104, the designation of a type of guidance content in steps S106 to S114, the designation of additional information concerning guidance content in steps S106 to S114, and the designation of a real object in the variations 1 and 2.

According to the variation 4, the guiding section 144 can execute the guidance processing according to the instruction input using the input device 300. Therefore, the user can operate the HMD 100 using a device other than the HMD 100. Therefore, it is possible to improve user convenience.

Figure 18:
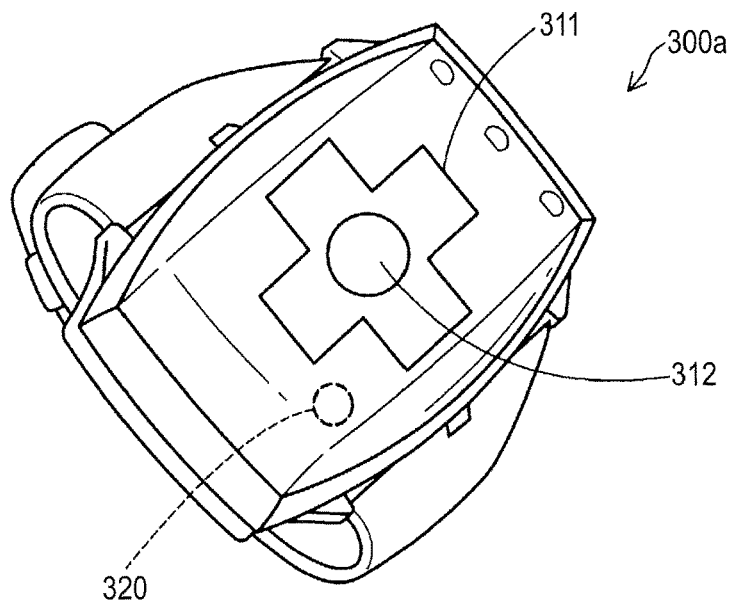
FIG. 18 is a diagram showing another example of the input device.

FIG. 18 is a diagram showing another example of the input device. An input device 300*a* shown in FIG. 18 includes a cross key 311 and a determination button 312 instead of the input surface 310. With such a configuration, effects same as the effects of the input device 300 shown in FIG. 16 can be attained.

A-4-5. Variation 5 (an Instruction by a Virtual Small Input Device)

A variation 5 makes it possible to designate an object of attention and designate guidance content using a virtual small input device (hereinafter simply referred to as "virtual input device" as well) realized by the HMD 100.

Figure 19:
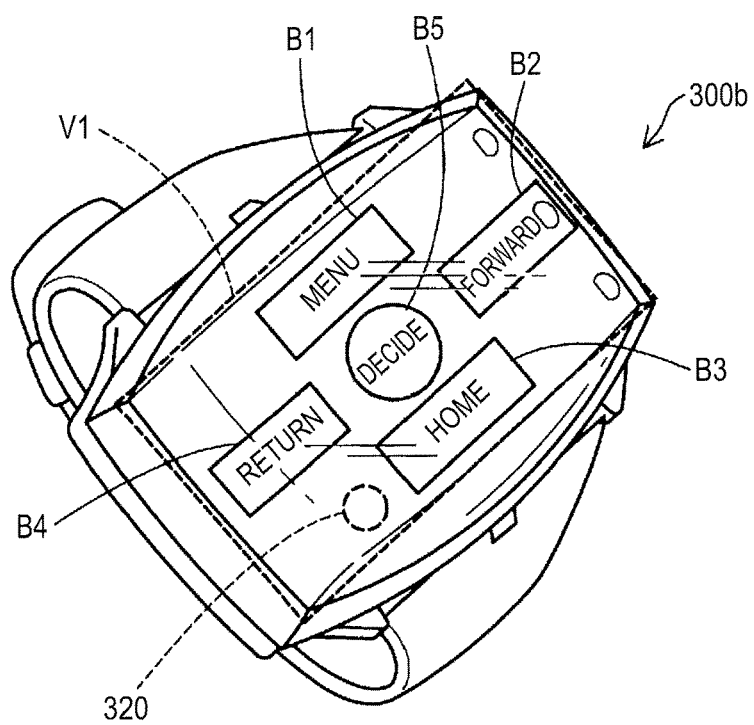
FIG. 19 is a diagram showing an example of a virtual input device.

FIG. 19 is a diagram showing an example of the virtual input device. A virtual input device 300*b* is realized by the virtual image VI by the HMD 100 being superimposed and displayed on a board surface of a normal watch (which may be either an analog watch or a digital watch). Specifically, when the user views a board surface of the virtual input device 300*b*, the augmented-reality processing section 142 of the HMD 100 superimposes and displays the virtual image VI on the board surface. The augmented-reality processing section 142 can determine, by recognizing an outside scene image acquired by the cameras 61, whether the user views the board surface of the virtual input device 300*b*.

The virtual image VI includes a "menu" button B1, a "forward" button B2, a "home" button B3, a "return" button B4, and a "decide" button B5. The "menu" button B1 is a button for displaying a menu screen of the HMD 100 as the virtual image VI. The "forward" button B2 is a button for putting a screen and an item, which are currently displayed or selected, forward to the next screen and the next item. The "home" button B3 is a button for returning a screen and an item, which are currently displayed, to an initial state. The "return" button B4 is a button for returning a screen and an item, which are currently displayed or selected, to the preceding screen and the preceding item. The "decide" button B5 is a button for deciding selected content. The buttons B1 to B5 function as a "virtual operation section". The input-information acquiring section 110 detects a motion of, for example, a part (e.g., a finger or a pointer) of the body of the user using an outside scene image (repeatedly) photographed over time by the cameras 61. The input-information acquiring section 110 can acquire a type of a button operated by the user by collating the detected motion of, for example, the part of the body of the user and the positions of the buttons B1 to B5. The collation can be carried out by, for example, calculating a region of a button among the buttons in the virtual operation section where the position (the coordinate) of the fingertip of the user in the outside scene image is present (or is close to).

The configuration of the variation 5 includes the information for guidance 122a shown in FIG. 15 instead of the information for guidance 122 shown in FIG. 5. In the variation 5, as in the variation 3, the guiding section 144 can acquire, from the virtual input device 300b, the designation of an object of attention in step S104, the designation of a type of guidance content in steps S106 to S114, the designation of additional information concerning guidance content in steps S106 to S114, and the designation of a real object in the variations 1 and 2.

According to the variation 5, the guiding section 144 can execute the guidance processing according to the instruction input using the virtual input device 300b. Therefore, the user can operate the HMD 100 using a virtual device other than the HMD 100. Therefore, it is possible to improve user convenience.

A-4-6. Variation 6 (Acquisition of Additional Information)

In a variation 6, additional information is further automatically acquired without depending on an input from the user in the configuration in which the "additional information" is used explained in the variation 3. Specifically, the guiding section 144 may combine a distance measuring sensor mounted on the HMD 100 and image recognition of an outside scene image acquired by the cameras 61 to estimate the size and the capacity of an object of attention. The guiding section 144 may combine a temperature sensor mounted on the HMD 100 and image recognition of an outside scene image acquired by the cameras 61 to estimate a temperature change in each of parts of an object of attention.

According to the variation 6, the guiding section 144 can automatically acquire the additional information. Therefore, it is possible to more accurately carry out guidance.

B. Modifications

In the embodiment, apart of the components explained as being realized by hardware may be replaced with software. Conversely, a part of the components explained as being realized by software may be replaced with hardware. Besides, modifications explained below are also possible.

Modification 1

In the embodiment, the configuration of the HMD is illustrated. However, the configuration of the HMD can be optionally decided in a range not departing from the spirit of the invention. For example, addition, deletion, and conversion of the components can be performed.

The allocation of the components to the control section and the image display section in the embodiment is only an example. Various forms can be adopted. For example, forms explained below may be adopted.

(i) A form in which processing functions such as a CPU and a memory are mounted on the control section and only a display function is mounted on the image display section (ii) A form in which processing functions such as CPUs and memories are mounted on both of the control section and the image display section (iii) A form in which the control section and the image display section are integrated (e.g., a form in which the control section is included in the image display section to function as a wearable computer of an eyeglass type)

(iv) A form in which a smart phone or a portable game machine is used instead of the control section (v) A form in which the control section and the image display section are connected via a wireless signal transmission line such as a wireless LAN, infrared communication, or Bluetooth and the connecting section (a cord) is removed. Note that, in this case, power supply to the control section and the image display section may be implemented wirelessly.

For example, the configuration of the control section illustrated in the embodiment can be optionally changed. Specifically, both of the transmitting sections (Tx) of the control section and the receiving sections (Rx) of the image display section may include a function of enabling bidirectional communication and function as transmitting and receiving sections. For example, apart of the interfaces for operation (the various keys, the track pad, etc.) included in the control section may be omitted. For example, the control section may include other interfaces for operation such as a stick for operation. For example, the control section may be configured to enable connection of devices such as a keyboard and a mouse thereto and receive inputs from the keyboard and the mouse. For example, the processing sections (e.g., the image processing section, the display control section, and the augmented-reality processing section) included in the control section may be configured using an ASIC (Application Specific Integrated Circuit) designed to realize the functions. For example, the secondary cell is mounted on the control section as the power supply. However, the power supply is not limited to the secondary cell. Various cells can be used as the power supply. For example, a primary cell, a fuel cell, a solar cell, or a thermal cell may be used.

For example, the configuration of the image display section illustrated in the embodiment can be optionally changed. Specifically, for example, the image-light generating section of the image display section may include components for realizing another system together with or instead of the components explained above (the backlights, the backlight control sections, the LCDs, and the LCD control sections). For example, the image-light generating section may include an organic EL (organic Electro-Luminescence) display and an organic EL control section. For example, the image-light generating section may include a digital micro mirror device or the like instead of the LCD. For example, the invention can also be applied to a head-mounted display device of a laser retinal projection type. For example, a bone conduction speaker may be provided instead of or together with the earphones. With reproduction of sound by the bone conduction speaker, it is possible to clearly transmit the sound to the user even in noisy environment (e.g., in a factory).

Figure 20A:
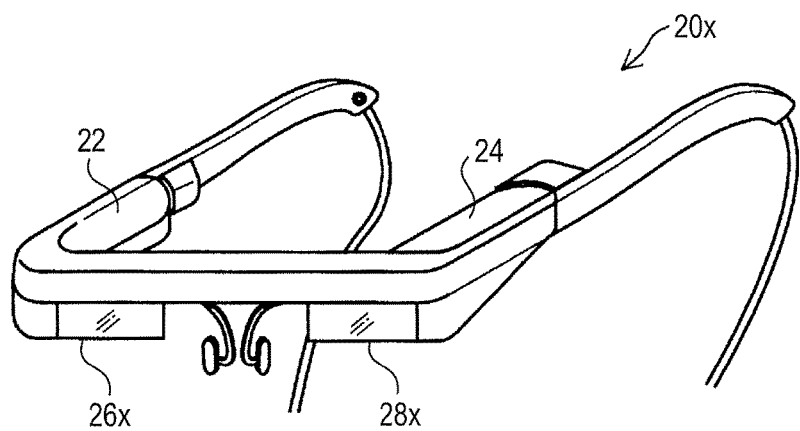
FIGS. 20A and 20B are explanatory diagrams showing the exterior configurations of HMDs in modifications.
Figure 20B:
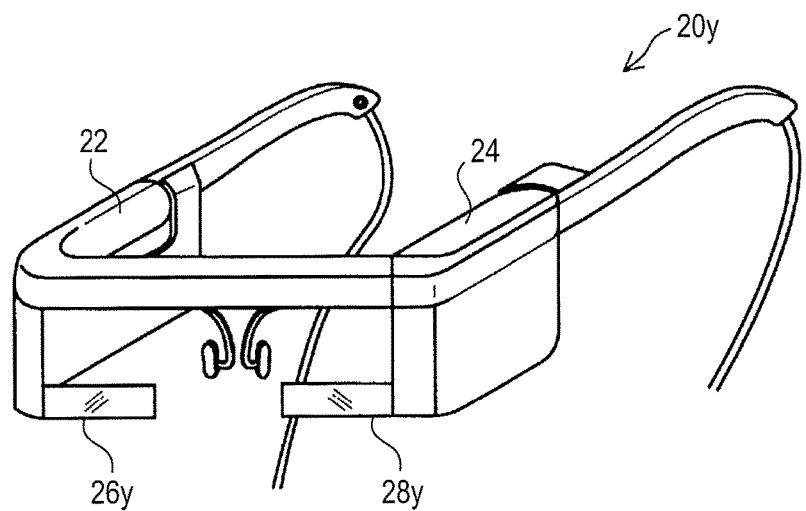

FIGS. 20A and 20B are explanatory diagrams showing exterior configurations of HMDs in modifications. An image display section 20x shown in FIG. 20A includes a right optical-image display section 26x and a left optical-image display section 28x. The optical-image display sections are formed smaller than the optical members in the embodiment and are respectively disposed obliquely above the left and right eyes of the user during the wearing of the HMD. An image display section 20y shown in FIG. 20B includes a right optical-image display section 26y and a left optical-image display section 28y. The optical-image display sections are formed smaller than the optical members in the embodiment and are respectively disposed obliquely below the left and right eyes of the user during the wearing of the HMD. In this way, the optical-image display sections only have to be disposed in the vicinities of the eyes. The sizes of optical members forming the optical-image display sections are optional. A form may be adopted in which the optical-image display sections cover only apart of the eyes of the user, in other words, the optical-image display sections do not completely cover the eyes of the user.

For example, the HMD is the transmissive HMD of a binocular type. However, the HMD may be a HMD of a monocular type. For example, the HMD may be configured as a nontransmissive HMD that blocks transmission of an outside scene in a state in which the user wears the HMD or may be configured as a video see-through HMD in which a camera is mounted on the nontransmissive HMD. For example, as the earphones, an ear hook type or a headband type may be adopted. The earphones may be omitted. For example, instead of the image display section worn like eyeglasses, a normal flat display device (a liquid crystal display device, a plasma display device, an organic EL display device, etc.) may be adopted. In this case, as in the embodiment, the control section and the image display section may be connected either by wire or by radio. Consequently, the control section can also be used as a remote controller of the normal flat display device. For example, instead of the image display section worn like eyeglasses, an image display section of another form such as an image display section worn like a cap or an image display section incorporated in a body protector such as a helmet may be adopted. For example, the image display section may be configured as a head-up display (HUD) mounted on vehicles such as an automobile and an airplane or other transportation means.

Modification 2

In the embodiment, an example of the guidance processing is explained. However, the procedure of the processing explained in the embodiment is only an example and various modifications are possible. For example, a part of the steps may be omitted or other steps may be added. The order of the executed steps may be changed.

For example, the guiding section may omit the detection of a visual line direction (step S108). In this case, the guiding section only has to carry out, with only voice, the guidance to the object of attention irrespective of the direction of the visual line of the user (step S112).

For example, the guiding section may acquire information provided by a DSSS (Driving Safety Support Systems) instead of or together with the acquisition of guidance content (step S106) and carry out the guidance by step S112 or step S114. The guiding section may acquire information provided by another "supporting system for vehicles, pedestrians, and the like" other than the DSSS and carry out the guidance by step S112 or step S114.

For example, in the guidance processing (steps S112 and S114), the guiding section may carry out only one of the guidance in the mode with tracking and the guidance in the mode without tracking. In this case, the guidance mode of the storing section may be omitted. For example, the guiding section may carry out the guidance in the mode without tracking in principle and carry out the guidance in the mode with tracking only when a predetermined condition is satisfied. The predetermined condition is, for example, whether a change with time of an object of attention is equal to or larger than a predetermined amount (a detailed determination method is the same as the method a1 explained above), whether a characteristic of the object of attention coincides with a predetermined characteristic (a detailed determination method is the same as the method a2 explained above), whether the visual line of the user is directed to the object of attention (a detailed determination method is the same as the method a3 explained above), or whether the object of attention is designated by the user (a detailed determination method is the same as the method a4 explained above).

For example, in the guidance processing (steps S112 and S114), when carrying out guidance using a predetermined number or more of guidance voices, the guiding section may reduce content of the guidance voices. Specifically, in the example shown in FIG. 10, the guiding section may reduce guidance voice "please beware of collision" to, for example, "beware of collision" and reduce guidance voice "please beware of the car ahead" to, for example, "watch ahead". The predetermined number may be two or more or three or more or can be set by the user. Consequently, it is possible to reduce time required for guidance performed using a plurality of guidance voices.

For example, in the guidance processing (steps S112 and S114), when carrying out guidance using a plurality of guidance voices, the guiding section may determine order for carrying out guidance according to importance degrees of objects of attention corresponding to the guidance voices. In the determination of the importance degrees of the objects of attention, the methods a1 to a4 explained above can be used to determine that, for example, priority order of an object of attention specified by the method a4 is first and priority order of an object of attention specified by the method a1 is second. The user may be capable of changing a correspondence relation between the specifying methods and the priority order of the objects of attention. Consequently, it is possible to guide guidance voice concerning the object of attention having high priority order first. Therefore, it is possible to improve convenience.

For example, in the guidance processing (steps S112 and S114), the guiding section may cause one of the speaker in the right earphone and the speaker in the left earphone to output guidance voice according to a positional relation between the object of attention and the user. Specifically, for example, the guiding section may cause the speaker in the right earphone to output the guidance voice when the object of attention is located on the right side of the user and cause the speaker in the left earphone to output the guidance voice when the object of attention is located on the left side of the user. For example, when a speaker having a wide frequency response characteristic and wide directivity is provided in the head-mounted display device, a voice processing system such as Dolby (registered trademark) can be used. In this case, the guiding section can generate voice data for reproducing the guidance voice from a position where the object of attention is present, supply the voice data to the voice processing system, and cause the voice processing system to output the guidance voice. Consequently, the user listening to the guidance voice can intuitively learn a positional relation between the user and the object of attention.

For example, in the guidance processing (steps S112 and S114), the guiding section may reproduce warning sound such as a buzzer, attention-calling sound such as an alarm, a melody, or the like instead of the guidance voice.

For example, in the guidance processing (steps S112 and S114), the guiding section may perform guidance to the object of attention with vibration instead of or together with the sound (an acoustic wave). In this case, a vibrating section incorporating a vibration motor or the like may be provided in the head-mounted display device. The guiding section only has to perform driving of the vibration motor instead of or together with reproduction of the guidance voice. In this case, the guiding section may drive one of a vibration motor incorporated in the right holding section and a vibration motor incorporated in the left holding section according to a positional relation between the object of attention and the user.

For example, the guiding section may add a parallax to the virtual object displayed in the guidance processing (step S114).

For example, guidance processing explained below may be carried out together with the guidance processing explained above. The head-mounted display device includes a distance acquiring section that acquires the distance between the user and the object of attention. The guiding section reproduces the guidance voice when the distance between the user and the object of attention is within a predetermined distance (e.g., 20 m). The guidance voice may be warning sound, attention-calling sound, or a melody. The guiding section may change the predetermined distance according to moving speed of the user (e.g., the predetermined distance is 20 m when the moving speed is 50 km/hour or more). Note that the distance acquiring section may acquire the distance in a stereo camera system in which the stereo cameras shown in FIG. 2 are used or may acquire the distance in a monocular camera system in which a monocular camera and a moving distance of the monocular camera are used. The distance acquiring section may acquire the distance in a pattern radiation system in which an infrared (or ultrasound) receiving/emitting section is used or may acquire the distance in a ToF (Time of Flight) system in which the infrared (or ultrasound) receiving/emitting section is used.

For example, as preprocessing of the guidance processing or as preprocessing of step S114 of the guidance processing, adjustment processing explained below may be carried out. The head-mounted display device includes an IMU (Inertial Measurement Unit). The CPU performs, using the IMU, association of a region in the visual field direction of the user (e.g., an image pickup region of a camera) and a display region of a virtual image in the image display section. Consequently, the augmented-reality processing section can improve accuracy of the alignment of the virtual object displayed in step S114 of the guidance processing and the real object (the object of attention). The augmented-reality processing section can suppress a blur of display of the virtual object due to a fine shift of the head of the user. When mask processing of an unnecessary image is carried out in the augmented reality processing, the augmented-reality processing section can improve the speed of the mask processing.

For example, under an environment in which users of a plurality of head-mounted display devices are present, in the guidance processing, the processing may be carried out using a relative positional relation among the users. Specifically, for example, in specifying an object of attention (step S104), a guiding section of an HMD 100x may specify, as objects of attention, users of other HMDs 100y, 100z, and the like having a predetermined relative positional relation with the user of the HMD 100x. For example, in the guidance (step S112 and S114), according to the relative positional relation between the user of the HMD 100x and the users of the other HMDs 100y, 100z, and the like, the guiding section of the HMD 100x may cause one of the speaker in the right earphone and the speaker in the left earphone to output the guidance voice and may adjust a position where a virtual object is displayed. Consequently, under the environment in which the users of the plurality of head-mounted display devices are present (e.g., in a factory or in a school), it is possible to realize guidance based on the relative positional relation of the users.

For example, in the variation 1 of the guidance processing (the designation of an object of attention by a motion of, for example, a part of the body of the user), the guiding section may further apply, according to the motion of for example, the part of the body of the user, for example, enlargement, reduction, rotation, adjustment of a disposition position, and the like of a virtual object added to the object of attention.

Modification 3

In the embodiment, an example of the information for guidance is explained. However, the components and the contents of the information for guidance explained in the embodiment are only an example. Various modifications are possible. For example, a part of the components may be omitted or other components may be added. The data stored in the information for guidance may be changed.

For example, the number of "object" columns, which are the information for the collation performed using the names and the like of the objects of attention, may be one or may be three or more.

For example, procedure information may be stored instead of or together with the guidance content. The "procedure information" is information used to teach a series of action procedures to the user of the HMD. The action procedures extensively include procedures of actions of various categories. The action procedures include, for example, a procedure of actions of a manufacturer in cooking or sewing, a procedure of actions of a worker in factor work, and a procedure of actions of an athlete in sports such as tennis. The action procedures also include procedures of thinking actions not involving a motion of the body of the user such as a procedure of thinking such as a thinking process and a procedure of thinking in a learning process. The procedures of the actions may be continuous or may be discontinuous at a fixed interval.

Modification 4

In the embodiment, the specific examples of the guidance processing are explained. However, the specific examples explained in the embodiment are only an example. Various modifications are possible. For example, the illustrated form of the guidance by voice and the illustrated form of the virtual object in the augmented-reality processing can be optionally changed.

For example, in the first and second specific examples, the real object is explained as one "object" unit. However, the guiding section may carry out the guidance processing assuming that a plurality of real objects are present in one "object". Specifically, the guiding section may carry out the guidance processing assuming that a plurality of real objects such as a body, a bumper, tires, and tail lamps are present in a "car", which is one object.

For example, in the first specific example, the guiding section may display, in the vicinity of the glass, a virtual object representing a graduation for guiding the user about a liquid amount. Similarly, the guiding section may display, at any point of the glass, a virtual object representing a mark for guiding about a position where pouring of liquid should be stopped. Similarly, the guiding section may display, in the vicinity of (desirably, below) the glass, a scale for guiding the user about weight. The guiding section may change a value of the scale according to a liquid amount or the like estimated by the image recognition.

For example, in the second specific example, the guiding section may change, according to the distance to the car ahead, the form of the virtual object for highlighting the car. Specifically, the guiding section can make the virtual object more conspicuous (larger and denser) as the distance to the car ahead is smaller.

Modification 5

The invention is not limited to the embodiment, the examples, and the modifications explained above and can be realized as various configurations without departing from the spirit of the invention. For example, the technical features in the embodiment, the examples, and the modifications corresponding to the technical features in the forms described in the summary can be replaced or combined as appropriate in order to solve a part or all of the problems or attain a part or all of the effects. Unless the technical features are explained in this specification as essential technical features, the technical features can be deleted as appropriate.

The entire disclosure of Japanese Patent Application Nos. 2015-005450, filed Jan. 15, 2015 and 2015-224556, filed Nov. 17, 2015 are expressly incorporated by reference herein.

What is claimed is:

1. A head-mounted display device with which a user can visually recognize a virtual image, the head-mounted display device comprising:
   an image display section configured to cause the user to visually recognize the virtual image;
   an image acquiring section configured to acquire an outside scene image; and
   a guiding section configured to guide, with sound, the user to an object of attention, which is at least one real object present in a real world and included in the acquired outside scene image and is a real object, wherein
   the image acquiring section repeatedly acquires the outside scene image,
   the guiding section further respectively recognizes an acquired plurality of outside scene images, and specifies, as the object of attention, a real object included in the plurality of outside scene images,
   the guiding section performs guidance in a first operation mode and a second operation mode,
   in the first operation mode, the guiding section repeatedly performs the guidance according to a change with time of the object of attention in an acquired plurality of the outside scene images, so as to perform the guidance while tracking the object of attention, and
   in the second operation mode, the guiding section performs the guidance to the object of attention only once.

2. The head-mounted display device according to claim 1, further comprising:
   a visual-line detecting section configured to detect a direction of a visual line of the user in the state in which the head-mounted display device is mounted,
   wherein the guiding section performs the guidance with the sound when it is estimated that the object of attention is absent in the detected direction of the visual line and, when it is estimated that the object of attention is present in the detected direction of the visual line, performs the guidance by, in addition to the sound, causing the image display section to form the virtual image including a virtual object to be additionally displayed on the object of attention.

3. The head-mounted display device according to claim 1, further comprising:
   a visual-line detecting section configured to detect a direction of a visual line of the user in the state in which the head-mounted display device is mounted, wherein
   the visual-line detecting section repeatedly detects the direction of the visual line, and
   the guiding section further collates an acquired plurality of the outside scene images and directions of the visual line detected a plurality of times and specifies, as the object of attention, a real object included in the plurality of outside scene images and estimated to be present ahead of the visual line at a high percentage.

4. The head-mounted display device according to claim 1, further comprising:
   an input-information acquiring section configured to acquire an operation input from the user, wherein
   the guiding section further collates the acquired outside scene image and the acquired operation input and specifies, as the object of attention, a real object included in the outside scene image and designated by the user.

5. The head-mounted display device according to claim 1, wherein the guiding section further acquires additional information used for the guidance.

6. A head-mounted display device with which a user can visually recognize a virtual image, the head-mounted display device comprising:
   an image display section configured to cause the user to visually recognize the virtual image;
   an image acquiring section configured to acquire an outside scene image; and
   a guiding section configured to guide, with sound, the user to an object of attention, which is at least one real object present in a real world and included in the acquired outside scene image and is a real object, wherein
   the guiding section performs guidance in a first operation mode and a second operation mode,
   in the first operation mode, the guiding section repeatedly performs the guidance according to a change with time of the object of attention in an acquired plurality of the outside scene images, so as to perform the guidance while tracking the object of attention,
   in the second operation mode, the guiding section performs the guidance to the object of attention only once, and
   the guidance quantifies the distance between the user and the object of attention in the real world in the acquired outside scene, and the guiding section reproduces the sound when the distance between the user and the object of attention is within a predetermined distance.

7. The head-mounted display device according to claim 6, wherein the guiding section determines, according to an operation input from the user, which of the quantified distance and the work content is included as the guidance.

8. The head-mounted display device according to claim 7, further comprising:

an input-information acquiring section that acquires the operation input from another device connected to the head-mounted display device.

9. The head-mounted display device according to claim 7, wherein the image display section forms the virtual image representing a virtual operation section for operating the head-mounted display device, and
wherein the device further comprises:
an input-information acquiring section that acquires the operation input by collating a motion of a part of the body of the user acquired by recognizing the repeatedly-acquired outside scene image and positions of sections in the virtual operation section.

10. A head-mounted display apparatus with which a user can visually recognize a virtual image, the head-mounted display device comprising:
an image display section configured to cause the user to visually recognize the virtual image;
an image acquiring section configured to repeatedly acquire an outside scene image; and
a guiding section configured to guide, with sound, the user to an object of attention, which is at least one real object present in a real world and included in the acquired outside scene image and is a real object, wherein
the image acquiring section repeatedly acquires the outside scene image,
the input-information acquiring section acquires data representing a gesture of a part of a body of the user selecting the object of attention by recognizing the repeatedly-acquired outside scene image in response to the user performing the gesture to select the object of attention,
the guiding section collates the acquired outside scene image and the user's gesture acquired as the operation input and specifies the object of attention on the basis of the data representing the acquired gesture,
the guiding section performs guidance in a first operation mode and a second operation mode,
in the first operation mode, the guiding section repeatedly performs the guidance according to a change with time of the object of attention in an acquired plurality of the outside scene images, so as to perform the guidance while tracking the object of attention, and
in the second operation mode, the guiding section performs the guidance to the object of attention only once.

11. The head-mounted display device according to claim 10, wherein the guiding section further causes the image display section to form the virtual image including a virtual object serving as a mark used by the user to designate the object of attention, at least one of a position, a size, and a shape of the virtual object being changed with time to follow the gesture of the user.

12. A method of controlling a head-mounted display device, the method comprising:
acquiring an outside scene image; and
guiding, with sound, the user to an object of attention, which is at least one real object present in a real world and included in the acquired outside scene image and is a real object,
wherein the image acquiring step repeatedly acquires the outside scene image, and the guiding step further respectively recognizes an acquired plurality of outside scene images, and specifies, as the object of attention, a real object included in the plurality of outside scene images, based on a ratio indicating a number of times the real object appears in the repeatedly acquired images;
performing guidance in a first operation mode and a second operation mode,
wherein in the first operation mode, the guidance is repeatedly performed according to a change with time of the object of attention in an acquired plurality of the outside scene images, so as to perform the guidance while tracking the object of attention, and
wherein in the second operation mode, the guidance to the object of attention is performed only once.

13. A non-transitory computer-readable storage medium storing a program instructing a computer to perform the functions comprising:
a function of acquiring an outside scene image; and
a function of guiding, with sound, the user to an object of attention, which is at least one real object present in a real world and included in the acquired outside scene image and is a real object,
wherein the image acquiring function repeatedly acquires the outside scene image, and the guiding function further respectively recognizes an acquired plurality of outside scene images, and specifies, as the object of attention, a real object included in the plurality of outside scene images,
wherein the guiding function performs guidance in a first operation mode and a second operation mode,
wherein in the first operation mode, the guiding function repeatedly performs the guidance according to a change with time of the object of attention in an acquired plurality of the outside scene images, so as to perform the guidance while tracking the object of attention, and
wherein in the second operation mode, the guiding function performs the guidance to the object of attention only once.

* * * * *